United States Patent
Huang et al.

(10) Patent No.: US 11,063,689 B2
(45) Date of Patent: *Jul. 13, 2021

(54) APPARATUS AND METHOD FOR DIVERSITY TRANSMISSION IN A WIRELESS COMMUNICATIONS SYSTEM

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,869

(22) Filed: Dec. 16, 2019

(65) Prior Publication Data
US 2020/0119832 A1 Apr. 16, 2020

Related U.S. Application Data

(63) Continuation of application No. 16/151,049, filed on Oct. 3, 2018, now Pat. No. 10,554,327, which is a
(Continued)

(30) Foreign Application Priority Data

Jul. 27, 2016 (JP) .............................. JP2016-147344

(51) Int. Cl.
*H04L 1/00* (2006.01)
*H04L 1/06* (2006.01)
(Continued)

(52) U.S. Cl.
CPC ......... *H04L 1/0003* (2013.01); *H04B 7/0413* (2013.01); *H04B 7/068* (2013.01);
(Continued)

(58) Field of Classification Search
CPC . H04L 27/2602; H04L 5/0092; H04L 5/0023; H04L 1/0003; H04L 1/0606;
(Continued)

(56) References Cited

U.S. PATENT DOCUMENTS 9,692,559 B1 6/2017 Zhang et al.
2008/0310526 A1 12/2008 Maltsev et al.
(Continued)

OTHER PUBLICATIONS

Extended European Search Report, dated Apr. 1, 2019, for European Application No. 17795816.2-1220, 8 pages.
(Continued)

*Primary Examiner* — Janice N Tieu
(74) *Attorney, Agent, or Firm* — Seed IP Law Group LLP

(57) ABSTRACT

An transmission apparatus of the present disclosure comprises a transmission signal generator which, in operation, generates a transmission signal that includes a non-legacy preamble and a data field, the non-legacy preamble comprising a first field for indicating a number of spatial streams (Nss) in the data field and a second field for indicating one of a plurality of modulation and coding schemes (MCSs), wherein two or more frequency diversity transmission schemes are supported and each of the two or more frequency diversity transmission schemes is specified based on a value of the Nss; and a transmitter which, in operation, transmits the generated transmission signal.

20 Claims, 20 Drawing Sheets

Related U.S. Application Data continuation of application No. PCT/JP2017/009908, filed on Mar. 13, 2017.

(60) Provisional application No. 62/335,277, filed on May 12, 2016.

(51) Int. Cl.
| | |
|---|---|
| *H04L 27/26* | (2006.01) |
| *H04B 7/06* | (2006.01) |
| *H04L 5/00* | (2006.01) |
| *H04J 11/00* | (2006.01) |
| *H04B 7/0413* | (2017.01) |

(52) U.S. Cl.
CPC ........ *H04B 7/0689* (2013.01); *H04J 11/0066* (2013.01); *H04L 1/00* (2013.01); *H04L 1/0606* (2013.01); *H04L 5/0025* (2013.01); *H04L 27/26* (2013.01); *H04L 27/2626* (2013.01); *H04L 27/2634* (2013.01); *H04L 5/0048* (2013.01); *H04L 27/2613* (2013.01)

(58) Field of Classification Search
CPC ... H04L 5/0025; H04L 27/26; H04L 27/2626; H04L 27/2634; H04L 5/0048; H04L 27/2613; H04B 1/7176; H04B 7/0413; H04B 7/068; H04B 7/0689; H04W 84/12; H04J 11/0066
See application file for complete search history.

(56) References Cited

U.S. PATENT DOCUMENTS

| | | | |
|---|---|---|---|
| 2012/0140845 | A1 | 6/2012 | Kwak et al. |
| 2015/0023449 | A1 | 1/2015 | Porat et al. |
| 2016/0044635 | A1* | 2/2016 | Seok ................ H04L 69/22 370/312 |
| 2016/0056930 | A1 | 2/2016 | Seok |
| 2016/0255610 | A1 | 9/2016 | Li et al. |
| 2016/0352552 | A1 | 12/2016 | Liu et al. |
| 2017/0126447 | A1 | 5/2017 | Yang et al. |
| 2017/0207838 | A1* | 7/2017 | Lomayev ............ H04B 7/0413 |
| 2017/0264351 | A1* | 9/2017 | Lomayev ............ H04L 5/0023 |

OTHER PUBLICATIONS

IEEE Computer Society, "Part 11: Wireless LAN Medium Access Control (MAC) and Physical Layer (PHY) Specifications," Amendment 3. Enhancements for Very High Throughput in the 60GHz Band, IEEE Standard for Information technology—Telecommunications and information exchange between systems Local and metropolitan area networks—Specific requirements, IEEE Std 802.11ad™-2012, Dec. 28, 2012, 598 pages.

International Search Report, dated Jun. 6, 2017, for International Application No. PCT/JP2017/009908, 2 pages.

Liu et al., "On QPSK DCM Modulation and LDPC Tone Mapper for DCM," IEEE 802.11-16/0056r0, Jan. 17, 2016, 20 pages.

Liu et al., "Reliable Dual Sub-Carrier Modulations (DCM) for HE-SIG-B and Data," IEEE 802.11-15/1068r1, Sep. 12, 2015, 25 pages.

Lu et al., "A Novel SFBC-OFDM Scheme for Doubly Selective Channels," *IEEE Transactions on Vehicular Technology* 58(5), Jun. 2009, pp. 2573-2578. (6 pages).

Stacey et al., "Proposed TGax draft specification," IEEE P802.11 Wireless LANs, Mar. 2, 2016, 159 pages.

\* cited by examiner

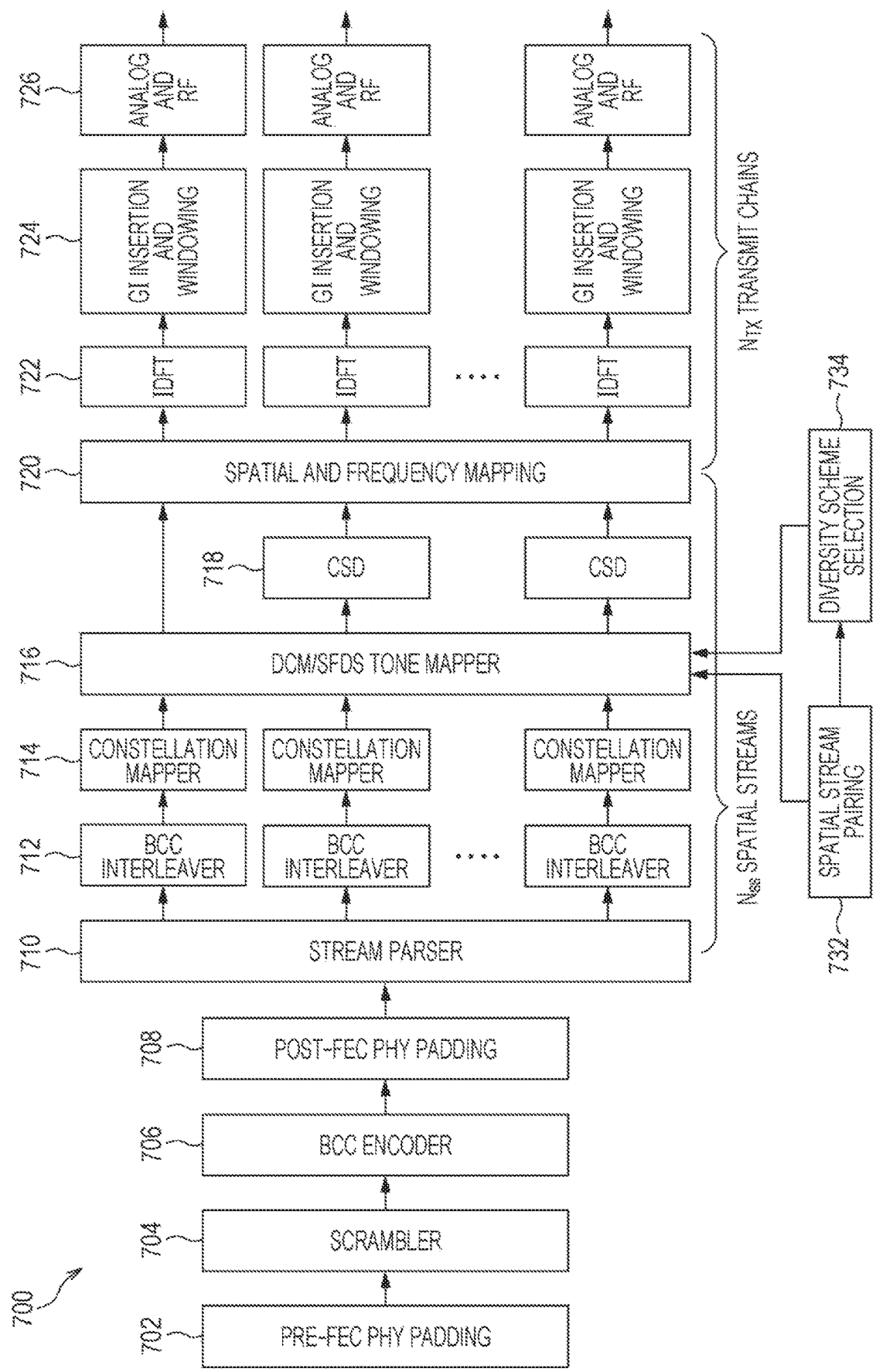

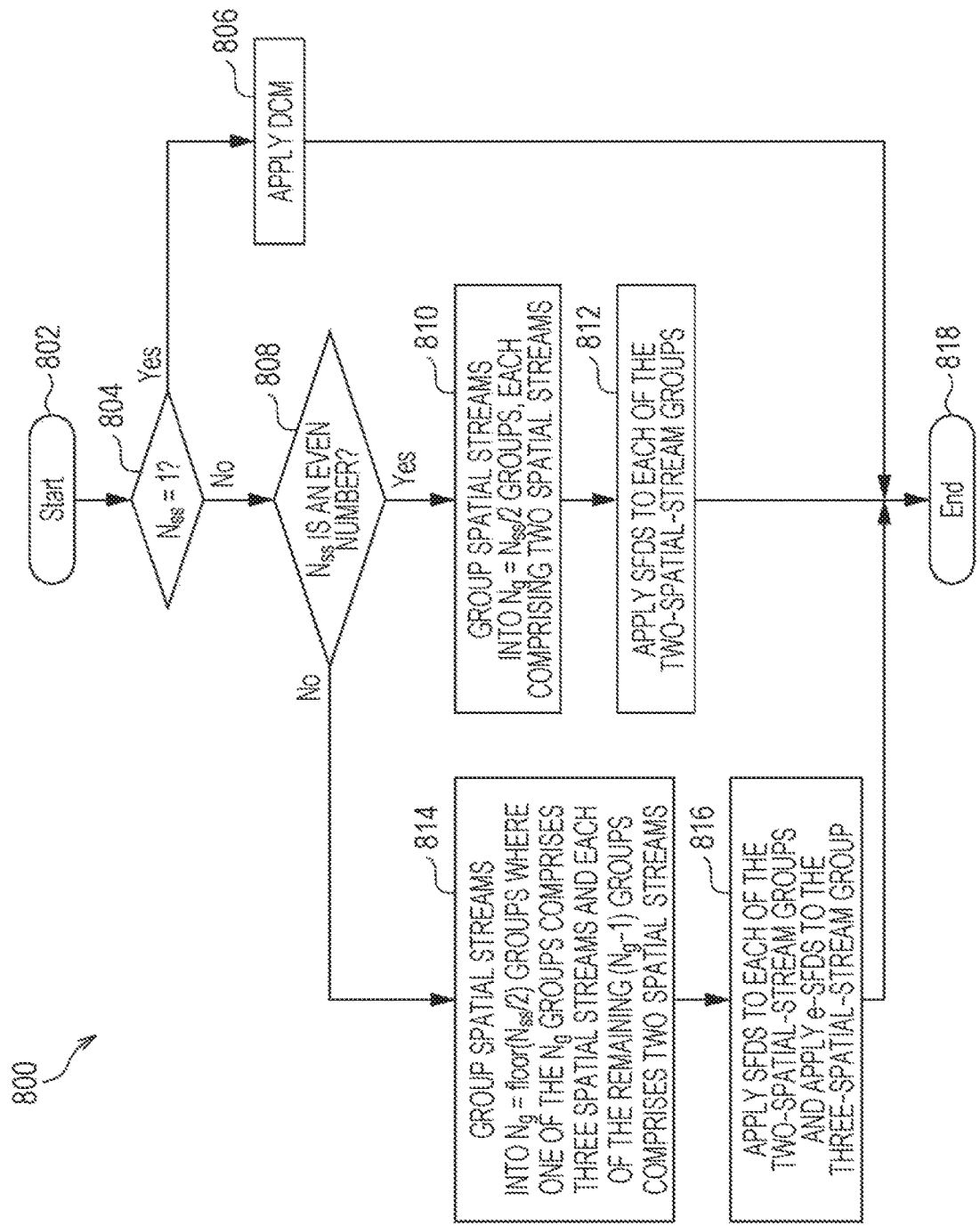

APPARATUS AND METHOD FOR DIVERSITY TRANSMISSION IN A WIRELESS COMMUNICATIONS SYSTEM

BACKGROUND

Technical Field

The present disclosure generally pertains to wireless communications and, more particularly, to an apparatus and a method for diversity transmission in a wireless communications system.

Description of the Related Art

The IEEE (Institute of Electrical and Electronics Engineers) 802.11 Working Group is developing 802.11ax HE (High Efficiency) WLAN (Wireless Local Area Network) air interface in order to achieve a very substantial increase in the real-world throughput achieved by users in high density scenarios. OFDMA (Orthogonal Frequency Division Multiple Access) multiuser transmission has been envisioned as one of the most important features in 802.11ax. OFDMA is a multiple access scheme that performs multiple operations of data streams to and from the plurality of users over the time and frequency resources of the OFDM (Orthogonal Frequency Division Multiplexing) system.

Frequency scheduling is generally performed for OFDMA multiuser transmission in 802.11ax. According to frequency scheduling, a radio communication access point apparatus (hereinafter simply "access point" or "AP") adaptively assigns subcarriers to a plurality of radio communication station apparatuses (hereinafter simply "terminal stations" or "STAs") based on reception qualities of frequency bands of the STAs. This makes it possible to obtain a maximum multiuser diversity effect and to perform communication quite efficiently.

Frequency scheduling is generally performed based on a Resource Unit (RU). A RU comprises a plurality of consecutive subcarriers. An RU may have different types depending on the number of constituent subcarriers per RU. The RUs are assigned by an AP to each of a plurality of STAs with which the AP communicates. The RU assignment result of frequency scheduling performed by the AP shall be reported to the STAs as RU assignment information. In addition, the AP shall also report other control signaling such as common control information and per-user allocation information to the STAs.

BRIEF SUMMARY

In 802.11ax, a STA may transmit a data field of an HE packet in one RU with about 2 MHz bandwidth in uplink OFDMA while the preamble of the HE packet is transmitted with 20 MHz bandwidth. Thus, the power spectral density of the data field of the HE packet is 9 dB higher than that of the preamble. Therefore one STA may experience severe narrow-band interference. In addition, PER (Packet Error Rate) performance of an HE packet also needs to be enhanced in order to extend transmission range for outdoor scenarios. Studies are underway to perform efficient diversity transmission in 802.11ax to mitigate narrow-band interference and to improve PER performance.

In one general aspect, the techniques disclosed here feature a transmission apparatus comprising: a transmission signal generator which, in operation, generates a transmission signal that includes a non-legacy preamble and a data field, the non-legacy preamble comprising a first field for indicating a number of spatial streams ($N_{ss}$) in the data field and a second field for indicating one of a plurality of modulation and coding schemes (MCSs), wherein two or more frequency diversity transmission schemes are supported and each of the two or more frequency diversity transmission schemes is specified based on a value of the $N_{ss}$; and a transmitter which, in operation, transmits the generated transmission signal.

With diversity transmission of the present disclosure, it is possible to mitigate narrow-band interference and to improve PER performance.

It should be noted that general or specific disclosures may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 7 shows an example configuration of a transmitter used to generate the HE data field of an HE packet for a single user transmission in a RU using diversity transmission and BCC according to the first embodiment of the present disclosure;

FIG. 8 shows a flowchart illustrating an example method for performing diversity transmission according to a second embodiment of the present disclosure;

DETAILED DESCRIPTION

Various embodiments of the present disclosure will now be described in detail with reference to the annexed drawings. In the following description, a detailed description of known functions and configurations has been omitted for clarity and conciseness.

Figure 1:
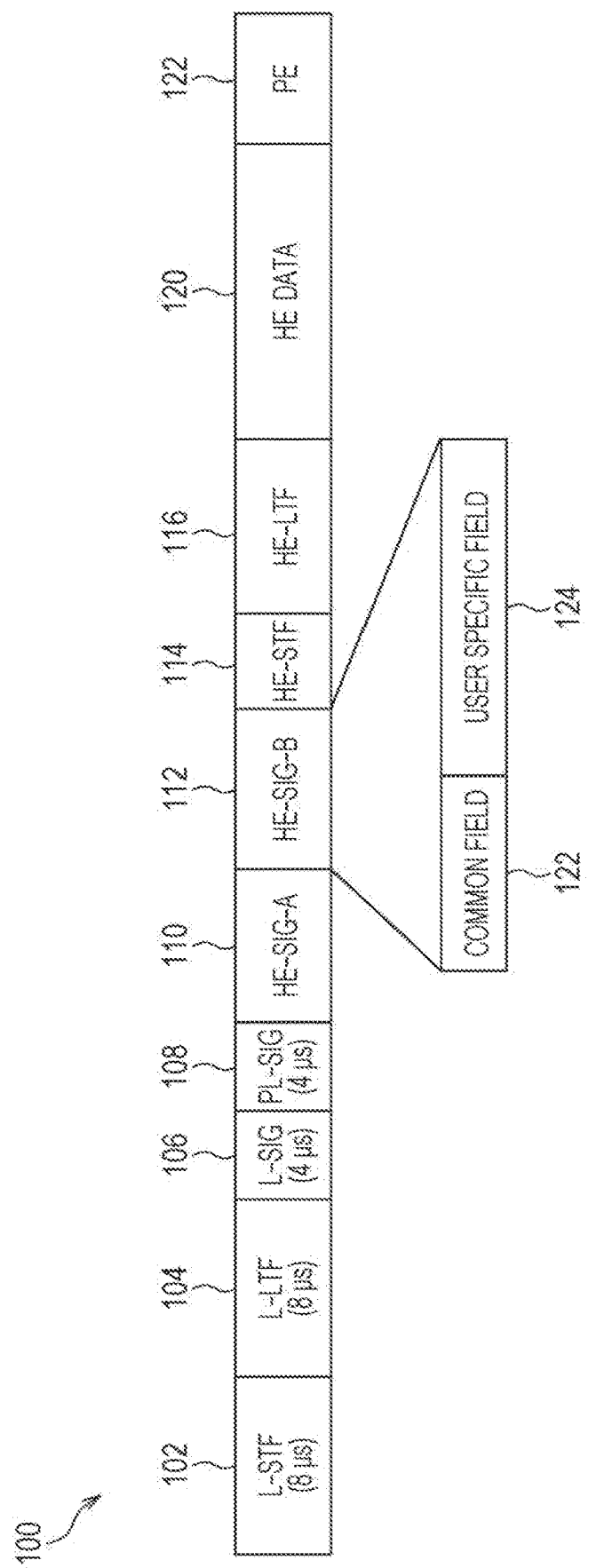
FIG. 1 shows a diagram illustrating a format of an HE (High Efficiency) packet complying with the proposed 802.11ax draft specification.

FIG. 1 illustrates a format of an HE (High Efficiency) packet 100 complying with the proposed 802.11ax draft specification [see IEEE 802.11-16/0024r1, Proposed TGax draft specification, March 2016]. The HE packet 100 includes: a legacy preamble comprising a legacy short training field (L-STF) 102, a legacy long training field (L-LTF) 104 and a legacy signal field (L-SIG) 106; an HE preamble comprising a repeated L-SIG field (RL-SIG) 108, a first HE signal field (HE-SIG-A) 110, a second HE signal field (HE-SIG-B) 112, an HE short training field (HE-STF) 114 and an HE long training field (HE-LTF) 116; an HE data field 120; and a packet extension (PE) field 122.

The legacy preamble (102, 104, 106) is used to facilitate backwards compatibility with the legacy 802.11a/g/n/ac standards. The L-STF 102 and L-LTF 104 are primarily used for packet detection, AGC (Automatic Gain Control) setting, frequency offset estimation, time synchronization and channel estimation. The L-SIG 106, together with the RL-SIG 108 in the HE preamble which is duplicated from the L-SIG 106, is used to assist in differentiating the HE packet 100 from the legacy 802.11a/g/n/ac packets. In addition, the L-SIG 106 comprises a Length field which indicates the transmission time of the HE packet 100.

The HE-SIG-A 110 in the HE preamble carries common control information required to interpret the remaining fields of the HE packet 100. In case of the HE packet 100 for single user transmission, the HE-SIG-A 110 comprises signaling fields such as a bandwidth field, an MCS (Modulation and Coding Scheme) field, an $N_{ss}$ field, a coding field and a DCM (Dual Subcarrier Modulation) field, etc. The MCS field indicates the modulation scheme and coding rate used in the HE data field 120. The modulation scheme can be BPSK (Binary Phase Shift Keying), QPSK (Quadrature Phase Shift Keying), 16-QAM (16-Quadrature Amplitude Modulation) and 64-QAM, etc. The $N_{ss}$ field indicates the number of spatial streams in the HE data field 120, the coding field indicates whether LDPC (Low Density Parity Coding) or BCC (Binary Convolutional Coding) is used in the HE data field 120, and the DCM field indicates whether the DCM is used in the HE data field 120. In case of the HE packet 100 for downlink multiuser transmission, the HE-SIG-A 110 comprises signaling fields such as a bandwidth field, a SIGB MCS field, a SIGB DCM field and a SIGB Number of Symbols field, etc.

The HE-SIG-B 112 in the HE preamble comprises a common field 122 followed by a user specific field 124. The common field 122 contains RU assignment information (e.g., the RU arrangement in frequency domain and the number of users multiplexed in each RU). If a RU is designated for single user transmission, the number of users multiplexed in the RU is one. If a RU is designated for MU-MIMO (Multiuser Multiple Input Multiple Output) transmission, the number of users multiplexed in the RU is two or more. The user specific field 124 comprises a plurality of user specific subfields. Each of the user specific subfields carries per-user allocation information. For each RU designated for single user transmission, there is only a single corresponding user specific subfield, which contains signaling fields such as STA identifier, $N_{ss}$, MCS, DCM and coding, etc. For each RU designated for MU-MIMO transmission with K multiplexed users, there are K corresponding user specific subfields, each comprising signaling fields such as STA identifier, spatial configuration, MCS, DCM and coding, etc. The ordering of the user specific subfields in the user specific field is compliant with the RU arrangement signaled by the common field 122. The HE-SIG-B 112 does not exist in the HE packet 100 if it intends to be used for single user transmission or for uplink triggered based multiuser transmission. For uplink triggered based multiuser transmission, RU assignment information and per-user allocation information for designated transmitting STAs are preset at the AP and transmitted in a trigger frame by the AP to the designated transmitting STAs.

The HE-STF 114 in the HE preamble is used to reset AGC and reduces the dynamic range requirement on the ADC (Analog-to-Digital Converter). The HE-LTF 116 in the HE preamble is provided for MIMO channel estimation for receiving and equalizing the HE data field 120. The HE data field 120 for a STA comprises the PSDU (Physical Layer Service Data Unit), which is transmitted on its designated RU spanning all of OFDM symbols in the HE data field 120. The PE field 122 carries null data, which is purely used to allow the receiver to have enough time to process the last OFDM symbol of the HE data field 120.

Details of transmission processing for the L-STF 102, the L-LTF 104, the L-SIG 106, the RL-SIG 108, the HE-SIG-A 110, the HE-SIG-B 112, the HE-STF 114, the HE-LTF 116, the HE data field 120 and the PE field 122 can be found in the proposed 802.11ax draft specification [see IEEE 802.11-16/0024r1, Proposed TGax draft specification, March 2016].

Figure 2:
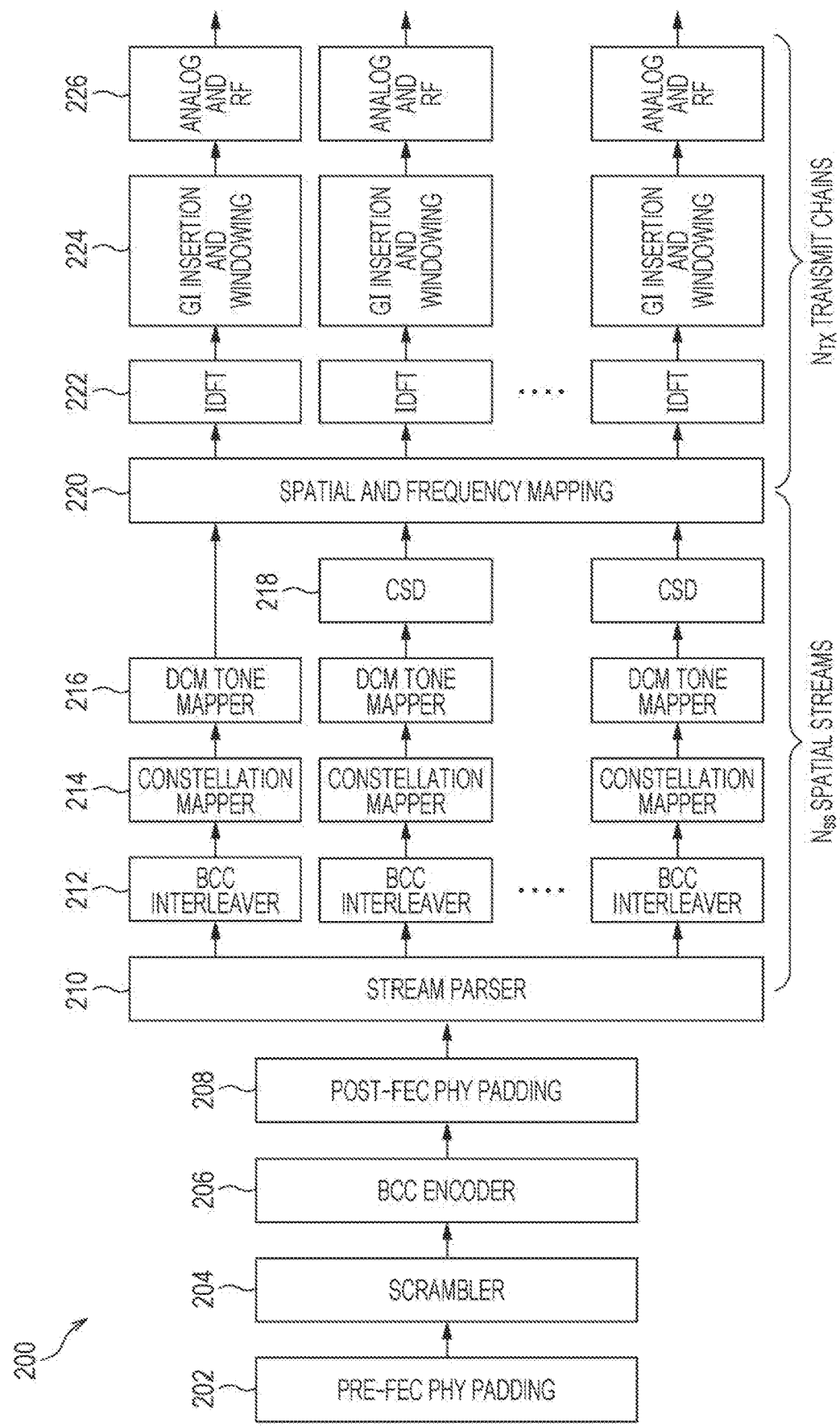
FIG. 2 shows an example configuration of a transmitter used to generate the HE data field of an HE packet for a single user transmission in a RU (Resource Unit) using DCM (Dual Subcarrier Modulation) and BCC (Binary Convolutional Coding) according to the proposed 802.11ax draft specification.

FIG. 2 illustrates an example configuration of transmitter 200 used to generate the HE data field 120 (see FIG. 1) for a single user transmission in a RU using DCM and BCC according to the proposed 802.11ax draft specification [see IEEE 802.11-16/0024r1, Proposed TGax draft specification, March 2016]. The transmitter 200 comprises a pre-FEC PHY padding block 202, a scrambler 204, a BCC encoder 206, a post-FEC PHY padding block 208, a stream parser 210, $N_{ss}$ number of BCC interleavers 212, $N_{ss}$ number of constellation mappers 214, $N_{ss}$ number of DCM tone mappers 216, ($N_{ss}$-1) number of CSD (Cyclic Shift Diversity) blocks 218, a spatial and frequency mapping block 220, $N_{TX}$ number of IDFT (Inverse Discrete Fourier Transform) blocks 222, $N_{TX}$ number of GI (Guard Interval) insertion and windowing blocks 224 and $N_{TX}$ number of analog and RF (Radio Frequency) blocks 226, where $N_{ss}$ is the number of spatial streams and $N_{TX}$ is the number of transmit chains.

The pre-FEC PHY padding block 202, the scrambler 204, the BCC encoder 206 and the post-FEC padding block 208 convert the PSDU into a sequence of encoded data bits. The stream parser 210 rearranges the sequence of encoded data bits into $N_{ss}$ data blocks, each of which corresponds to a particular spatial stream. For each of $N_{ss}$ spatial streams, the corresponding BCC interleaver 212 interleaves the encoded bits in the data block. The corresponding constellation mapper 214 maps the encoded and interleaved bits in the data block to modulation constellation points. The corresponding DCM tone mapper 216 operates the DCM on the modulation constellation points, followed by cyclic shift insertion by the corresponding CSD block 218, except for the first spatial stream. The spatial and frequency mapping block 220 maps the modulation constellation points of $N_{ss}$ spatial streams for a single user transmission in the RU to $N_{TX}$ transmit chains. For each of $N_{TX}$ transmit chains, the IDFT block 222 converts modulation constellation points to a plurality of time domain OFDM symbols. The GI insertion and windowing block 224 prepends to each OFDM symbol a circular extension of itself and optionally smooths the edges of each OFDM symbol to increase spectral decay. The analog and RF block 226 converts the plurality of time domain OFDM symbols to the analog signal which is transmitted through antenna(s).

Figure 3:
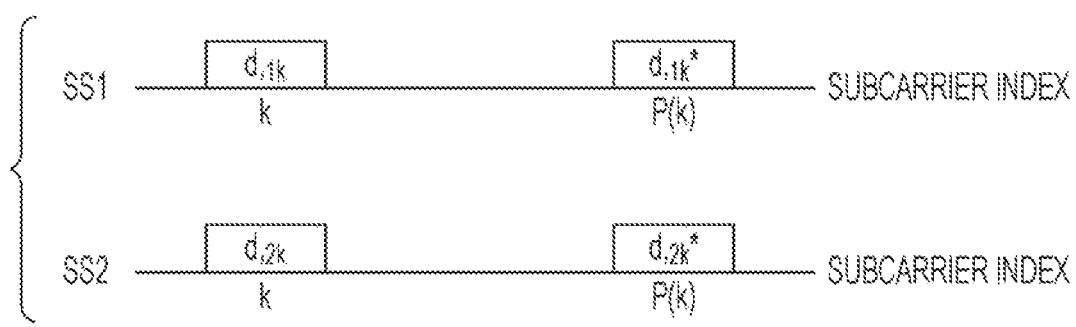
FIG. 3 shows a diagram illustrating an example operation of the DCM in case of QPSK (Quadrature Phase Shift Keying) modulation according to the prior arts.

FIG. 3 illustrates an example operation of the DCM (Dual Sub-Carrier Modulation) in case of QPSK modulation according to the prior arts [see IEEE 802.11-16/0024r1, Proposed TGax draft specification, March 2016; IEEE 802.11-16/0056r0, On QPSK DCM Modulation and LDPC Tone Mapper for DCM, January 2016; IEEE 802.11-15/1068r1, Reliable Dual Sub-Carrier Modulations (DCM) for HE-SIG-B and Data, September 2015; and IEEE Std 802.11ad™-2012]. The DCM is performed per spatial stream. The encoded and interleaved bits in the data block corresponding to the first spatial stream SS1 are modulated by QPSK and mapped to the lower half of data subcarriers (left-hand side in FIG. 3) in the RU corresponding to the first spatial stream SS1, i.e., $\{d_{1,k}, k=0, 1, \ldots, N_{SD}/2-1\}$ where $N_{SD}$ is the number of data subcarriers in the RU. The modulated symbols of the lower half of data subcarriers in the RU corresponding to the first spatial stream SS1 are repeated, conjugated and then mapped to the upper half of data subcarriers (right-hand side in FIG. 3) in the RU corresponding to the first spatial stream, i.e., $$\{d_{1,P(k)}=d^*_{1,k} N_{SD}/2 \leq P(k) \leq N_{SD}-1 \text{ and } k=0,1,\ldots,N_{SD}/2-1\}$$

where P(k) is a function of the subcarrier index k, e.g., $P(k)=k+N_{SD}/2$. Similarly, the encoded and interleaved bits in the data block corresponding to the second spatial stream SS2 are modulated by QPSK and mapped to the lower half of data subcarriers in the RU corresponding to the second spatial stream SS2, i.e., $\{d_{2,k}, k=0, 1, \ldots, N_{SD}/2-1\}$. The modulated symbols of the lower half of data subcarriers in the RU corresponding to the second spatial stream SS2 are repeated, conjugated and then mapped to the upper half of data subcarriers in the RU corresponding to the second spatial stream SS2, i.e., $$\{d_{2,P(k)}=d^*_{2,k} N_{SD}/2 \leq P(k) \leq N_{SD}-1 \text{ and } k=0,1,\ldots,N_{SD}/2-1\}.$$

In this way, frequency diversity gain can be obtained. Consequently, narrow-band interference can be mitigated and PER performance can be improved.

Figure 4:
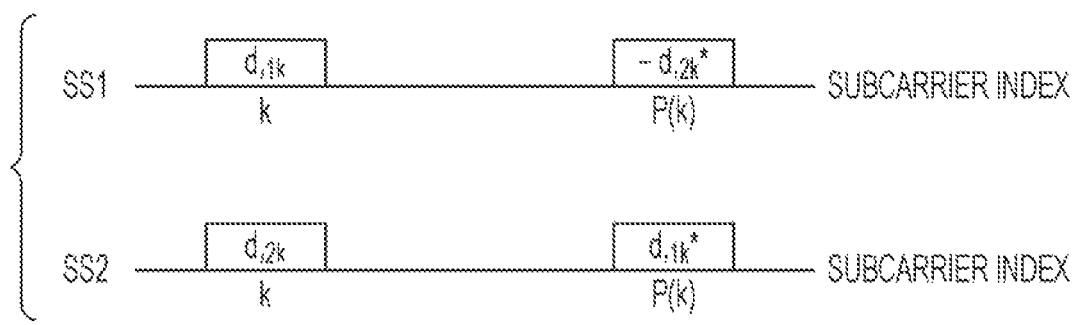
FIG. 4 shows a diagram illustrating an example operation of the SFBC (Space Frequency Block Coding) which is a kind of the SFDS (Space Frequency Diversity Scheme) according to the prior arts.

FIG. 4 illustrates an example operation of the SFBC (Space Frequency Block Coding) which is a kind of the SFDS (Space Frequency Diversity Scheme) according to the prior arts [see U.S. Pat. No. 9,160,492 B2; and A Novel SFBC-OFDM Scheme for Doubly Selective Channels, IEEE TRANSACTIONS ON VEHICULAR TECHNOLOGY, VOL. 58, NO. 5, JUNE 2009, p. 2573-2578]. The SFBC is performed across two spatial streams. The encoded and interleaved bits in the data block corresponding to the first spatial stream SS1 are modulated and mapped to the lower half of data subcarriers (left-hand side in FIG. 4) in a RU corresponding to the first spatial stream SS1, i.e., $\{d_{1,k}, k=0, 1, \ldots, N_{SD}/2-1\}$. The modulated symbols of the lower half of data subcarriers in the RU corresponding to the first spatial stream SS1 are repeated, conjugated and then mapped to the upper half of data subcarriers (right-hand side in FIG. 4) in the RU corresponding to the second spatial stream SS2, i.e., $$\{d_{2,P(k)}=d^*_{1,k} N_{SD}/2 \leq P(k) \leq N_{SD}-1 \text{ and } k=0,1,\ldots,N_{SD}/2-1\}.$$

On the other hand, the encoded and interleaved bits in the data block corresponding to the second spatial stream SS2 are modulated and mapped to the lower half of data subcarriers in the RU corresponding to the second spatial stream SS2, i.e., $\{d_{2,k}, k=0, 1, \ldots, N_{SD}/2-1\}$. The modulated symbols of the lower half of data subcarriers in the RU corresponding to the second spatial stream SS2 are repeated, conjugated, inverted and then mapped to the upper half of data subcarriers in the RU corresponding to the first spatial stream SS1, i.e., $$\{d_{1,P(k)} = -d^*_{2,k}, N_{SD}/2 \leq P(k) \leq N_{SD}-1 \text{ and} \\ k=0,1,\ldots,N_{SD}/2-1\}.$$

In this way, spatial diversity gain can be obtained besides frequency diversity gain.

Notice that both the DCM as illustrated in FIG. 3 and the SFDS as illustrated in FIG. 4 may not be used in case of higher order modulation (e.g., 64-QAM), since they may reduce data rate for higher order modulation at a cost of achieving better PER performance.

The DCM as illustrated in FIG. 3 is applicable to diversity transmission with any number of spatial streams. However, the DCM as illustrated in FIG. 3 does not bring spatial diversity gain. On the other hand, the SFDS as illustrated in FIG. 4 has both spatial diversity gain and frequency diversity gain for diversity transmission with two spatial streams. However, it is unclear how the SFDS as illustrated in FIG. 4 can be extended to diversity transmission with more than two spatial streams. Next, according to the present disclosure, various embodiments of an apparatus and a method for performing diversity transmission with any number of spatial streams in such a manner that both spatial diversity gain and frequency diversity gain can be obtained as much as possible will be explained in further details.

First Embodiment

Figure 5:
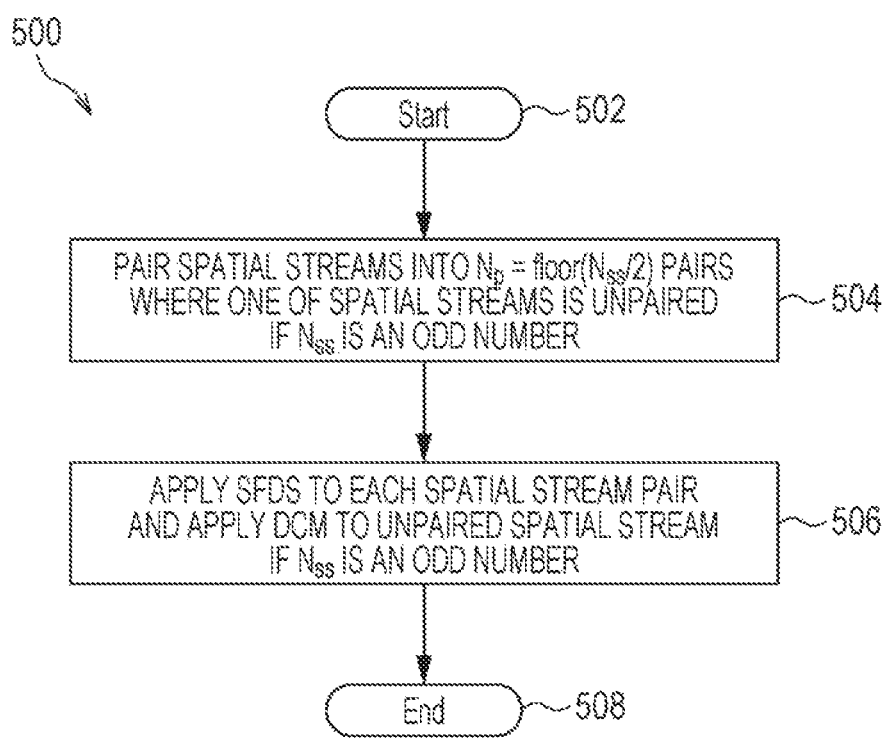
FIG. 5 shows a flowchart illustrating an example method for performing diversity transmission according to a first embodiment of the present disclosure.

FIG. 5 illustrates an example method 500 for performing diversity transmission with any number of spatial streams according to a first embodiment of the present disclosure. The method 500 starts at step 502. At step 504, Nss spatial streams are paired into $N_p$=pairs where $$N_p = \text{floor}(N_{ss}/2) \qquad (1).$$

Notice that one of spatial streams is unpaired if $N_{ss}$ is an odd number.

According to the first embodiment of the present disclosure, the method for pairing spatial streams can be configurable or predetermined. In case that there are several methods for pairing spatial streams are configurable, an additional signaling is required in the HE-SIG-A 110, the user-specific subfield of the HE-SIG-B 112 or the trigger frame to indicate the method that is actually used for pairing spatial streams used.

According to the first embodiment of the present disclosure, for open-loop (OL) MIMO transmission, spatial streams can be paired based on physical antenna configuration and mapping of spatial streams to antennas so that the correlation between the paired spatial streams is as weak as possible. In order to achieve that, it is preferable to avoid pairing of the spatial streams to be transmitted through adjacent antennas and to maximize the minimum physical distance between the antennas through which the paired spatial streams are transmitted. In case that the stream indices assigned to spatial streams are in align with the physical antenna configuration, an example method for pairing spatial streams into $N_p$ pairs comprises pairing every two spatial streams separated by $N_p$ in terms of stream index together, starting from the spatial stream with the smallest stream index. If $N_{ss}$ is an odd number, the spatial stream with the largest stream index is unpaired. As a result, spatial diversity gain for each of paired spatial streams may be improved, especially for OL MIMO transmission with direct mapping.

Figure 6A:
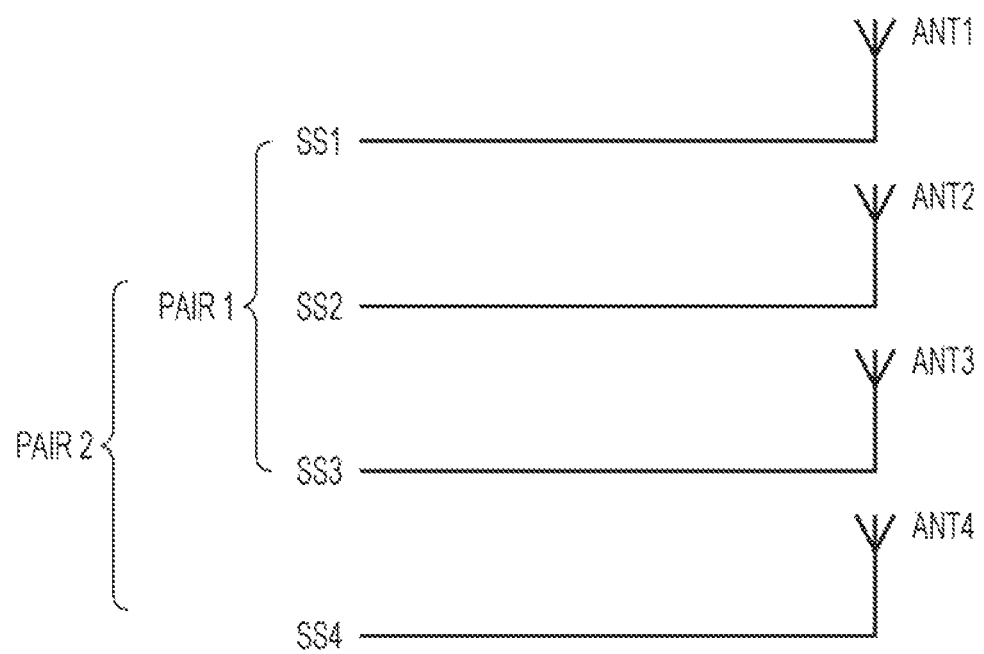
FIG. 6A shows a diagram illustrating an example pairing of spatial streams in case of OL (Open Loop) MIMO (Multiple Input Multiple Output) transmission with direct mapping and four spatial streams according to the first embodiment of the present disclosure, where the stream indices assigned to spatial streams are in align with the physical antenna configuration.

FIG. 6A illustrates an example pairing of spatial streams in case of OL MIMO transmission with direct mapping and four spatial streams according to the first embodiment of the present disclosure. Here, the stream indices assigned to spatial streams are in align with the physical antenna configuration. Notice that correlation between the first spatial stream SS1 and the third spatial stream SS3 is generally weaker than correlation between the first spatial stream SS1 and the second spatial stream SS2 and but is similar to correlation between the second spatial stream SS2 and the fourth spatial stream SS4. Thus, it is better to pair SS1 and SS3 and to pair SS2 and SS4 so that each of the four spatial streams can achieve similar and better spatial diversity gain.

Figure 6B:
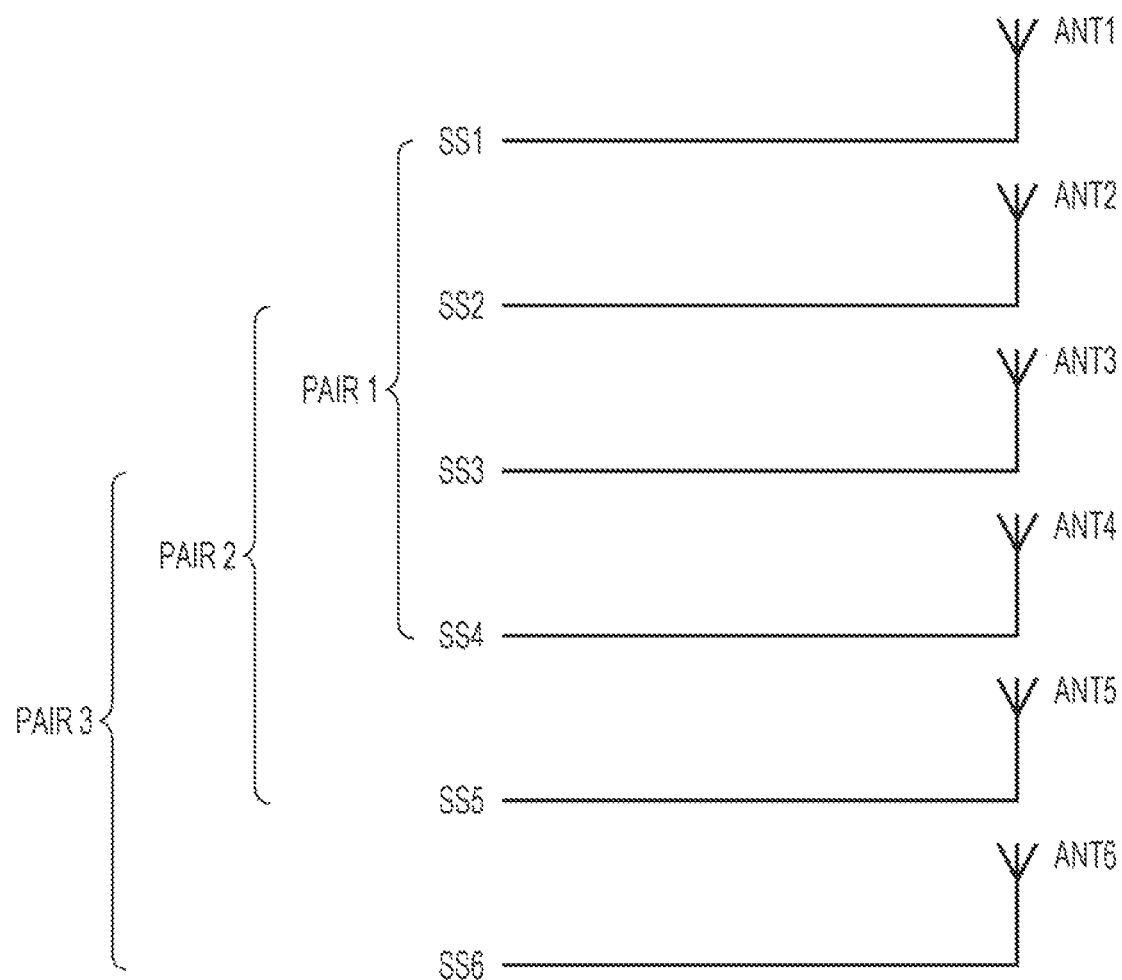
FIG. 6B shows a diagram illustrating another example pairing of spatial streams in case of OL MIMO transmission with direct mapping and six spatial streams according to the first embodiment of the present disclosure, where the stream indices assigned to spatial streams are in align with the physical antenna configuration.

FIG. 6B illustrates another example pairing of spatial streams in case of OL MIMO transmission with direct mapping and six spatial streams according to the first embodiment of the present disclosure. Here, the stream indices assigned to spatial streams are in align with the physical antenna configuration. Notice that correlation between the first spatial stream SS1 and the fourth spatial stream SS4 is generally weaker than correlation between the first spatial stream SS1 and the second spatial stream SS2 or between the first spatial stream SS1 and the third spatial stream SS3 and but is similar to correlation between the second spatial stream SS2 and the fifth spatial stream SS5 or between the third spatial stream SS3 and the sixth spatial stream SS6. Thus, it is better to pair SS1 and SS4, to pair SS2 and SS5 and to pair SS3 and SS6 so that each of the six spatial streams can achieve similar and better spatial diversity gain.

Figure 6C:
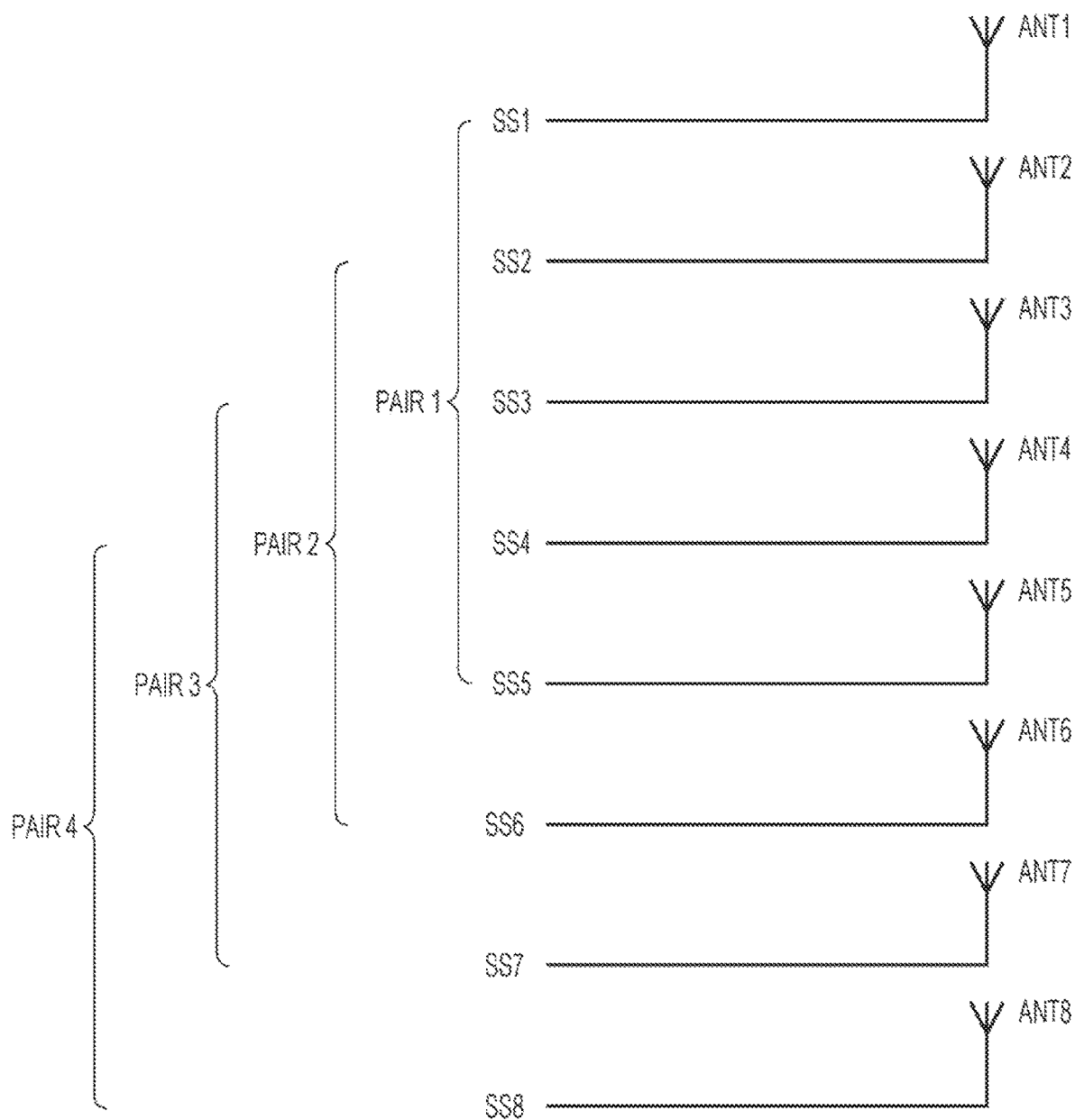
FIG. 6C shows a diagram illustrating another example pairing of spatial streams in case of OL MIMO transmission with direct mapping and eight spatial streams according to the first embodiment of the present disclosure, where the stream indices assigned to spatial streams are in align with the physical antenna configuration.

FIG. 6C illustrates another example pairing of spatial streams in case of OL MIMO transmission with direct mapping and eight spatial streams according to the first embodiment of the present disclosure. Here, the stream indices assigned to spatial streams are in align with the physical antenna configuration. Notice that correlation between the first spatial stream SS1 and the fifth spatial stream SS5 is generally weaker than correlation between the first spatial stream SS1 and the second spatial stream SS2, between the first spatial stream SS1 and the third spatial stream SS3, or between the first spatial stream SS1 and the fourth spatial stream SS4 and but is similar to correlation between the second spatial stream SS2 and the sixth spatial stream SS6, between the third spatial stream SS3 and the seventh spatial stream SS7, or between the fourth spatial stream SS4 and the eighth spatial stream SS8. Thus, it is better to pair SS1 and SS5, pair SS2 and SS6, pair SS3 and SS7 and pair SS4 and SS8 so that each of SS1 to SS8 can achieve similar and better spatial diversity gain.

Figure 6D:
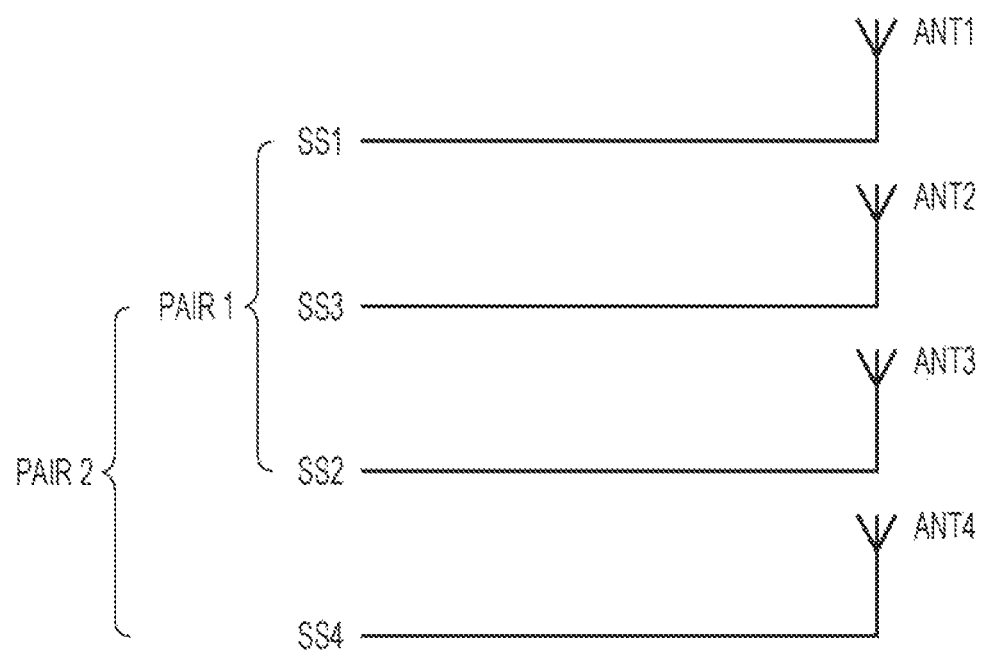
FIG. 6D shows a diagram illustrating another example pairing of spatial streams in case of OL MIMO transmission with direct mapping and four spatial streams according to the first embodiment of the present disclosure, where the stream indices assigned to spatial streams are not in align with the physical antenna configuration.

FIG. 6D illustrates another example pairing of spatial streams in case of OL MIMO transmission with direct mapping and four spatial streams according to the first embodiment of the present disclosure. Here, the stream indices assigned to spatial streams are not in align with the physical antenna configuration. Notice that correlation between the first spatial stream SS1 and the second spatial stream SS2 is generally weaker than correlation between the first spatial stream SS1 and the third spatial stream SS3 and but is similar to correlation between the third spatial stream SS3 and the fourth spatial stream SS4. Thus, it is better to pair SS1 and SS2 and pair SS3 and SS4 so that SS1, SS2, SS3, and SS4 can achieve similar and better spatial diversity gain.

At step 506 in FIG. 5, the SFDS as illustrated in FIG. 4 is applied to each spatial stream pair. If Nss is an odd number, the DCM as illustrated in FIG. 3 is applied to the unpaired spatial stream. The method 500 stops at step 508.

According to the first embodiment of the present disclosure, diversity transmission is enabled for a single user transmission in a RU and the two diversity transmission schemes including the DCM and the SFDS are applicable to the modulation scheme used in the RU. Diversity transmission schemes used in the RU are determined exclusively according to the number of spatial streams, Nss, to be transmitted in the RU as follows:

If Nss is an even number, the SFDS is applied to each of $N_p$ spatial stream pairs. For example, in case of $N_{ss}$=2, the SFDS is applied to a single spatial stream pair.

If $N_{ss}$ is an odd number, the SFDS is applied to each of $N_p$ spatial stream pairs and the DCM is applied to an unpaired spatial stream. For example, in case of $N_{ss}$=1, the DCM is applied to a single spatial stream. In case of $N_{ss}$=3, the SFDS is applied to a single spatial stream pair and the DCM is applied to a remaining unpaired spatial stream.

According to the first embodiment of the present disclosure, the DCM field in the HE-SIG-A 110, the user-specific subfield of the HE-SIG-B 112 of an HE packet 100 in FIG. 1 or the trigger frame can be repurposed to indicate whether the diversity transmission is enabled. In case that the diversity transmission is enabled, the receiver is able to determine which diversity transmission scheme(s) is used for a single user transmission in a RU according to the number of spatial streams, $N_{ss}$.

According to the above-mentioned configuration, by using the SFDS as the diversity transmission scheme for each of paired spatial streams, both frequency diversity and spatial diversity gain can be obtained for each of paired spatial streams if two or more spatial streams are transmitted in a RU. Thus, narrow-band interference experienced by an HE packet 100 is mitigated and PER performance of the HE packet 100 is improved. Further, since a transmitter determines which diversity transmission scheme to be used for which spatial stream based on the number of spatial streams, a receiver is able to know which diversity transmission scheme is used for which spatial stream without receiving additional signaling bits for reporting which diversity transmission scheme is actually used for which spatial stream, even when two or more spatial streams are transmitted in a RU. Thus, no extra signaling bits are required for supporting the above-mentioned configuration. This is very important since the HE-SIG-A field or the user-specific subfield of HE-SIG-B field may not have enough signaling bits to indicate which diversity transmission scheme is used for which spatial stream.

According to the first embodiment of the present disclosure, the unpaired spatial stream to which the DCM is applied does not enjoy spatial diversity gain if $N_{ss}$ is an odd number.

According to the first embodiment of the present disclosure, prior to decoding the HE data field 120 of an HE packet 100 for a single user transmission in a RU, a receiver shall be able to know how spatial streams are paired according to the number of spatial streams, $N_{ss}$. For example, if $N_{ss}$=4, the first spatial stream pair comprises the first spatial stream SS1 and the third spatial stream SS3 and the second spatial stream pair comprises the second spatial stream SS2 and the fourth spatial stream SS4.

According to the first embodiment of the present disclosure, the method for decoding the HE data field 120 of an HE packet 100 for a single user transmission in a RU at the receiver in case that $N_{ss}$ is an even number comprises decoding the information bits from a first spatial stream and a second spatial stream in each of $N_p$ spatial stream pairs and deparsing $N_{ss}$ spatial streams to obtain a sequence of decoded information bits.

According to the first embodiment of the present disclosure, the method for decoding the HE data field 120 of an HE packet 100 for a single user transmission in a RU at the receiver in case that $N_{ss}$ is an odd number comprises decoding the information bits from a first spatial stream and a second spatial stream in each of $N_p$ spatial stream pairs; decoding the information bits from the unpaired spatial stream and deparsing $N_{ss}$ spatial streams to obtain a sequence of decoded information bits.

According to the first embodiment of the present disclosure, for decoding the information bits from a first spatial stream in a spatial stream pair, the receiver calculates the LLR (Likelihood Ratio) at a first data subcarrier k (k=0, 1, . . . , $N_{SD}$/2−1) corresponding to the first spatial stream in the pair and the LLR at a second data subcarrier P(k)

$(N_{SD}/2 \le P(k) \le N_{SD}-1$ and $k=0,1,\ldots,N_{SD}/2-1)$ corresponding to a second spatial stream in the pair, and then combines both LLRs. For decoding the information bits from the second spatial stream in the spatial stream pair, the receiver calculates the LLR at the first data subcarrier k (k=0, 1, . . . , $N_{SD}$/2−1) corresponding to the second spatial stream in the pair and the LLR at the second data subcarrier P(k)

$(N_{SD}/2 \le P(k) \le N_{SD}-1$ and $k=0,1,\ldots,N_{SD}/2-1)$ corresponding to the first spatial stream in the pair, and then combines both LLRs.

According to the first embodiment of the present disclosure, for decoding the information bits from an unpaired spatial stream, the receiver calculates the LLR at a first data subcarrier k (k=0, 1, . . . , $N_{SD}$/2−1) corresponding to the unpaired spatial stream and the LLR at a second data subcarrier P(k)

$(N_{SD}/2 \le P(k) \le N_{SD}-1$ and $k=0,1,\ldots,N_{SD}/2-1)$ corresponding to the unpaired spatial stream, and then combines both LLRs.

FIG. 7 illustrates an example configuration of transmitter 700 used to generate the HE data field 120 of an HE packet 100 (see FIG. 1) for a single user transmission in a RU using diversity transmission and BCC according to the first embodiment of the present disclosure. The transmitter 700 comprises a pre-FEC PHY padding block 702, a scrambler 704, a BCC encoder 706, a post-FEC PHY padding block 708, a stream parser 710, $N_{ss}$ number of BCC interleavers 712, $N_{ss}$ number of constellation mappers 714, a DCM/SFDS tone mapper 716, ($N_{ss}$−1) CSD blocks 718, a spatial and frequency mapping block 720, $N_{TX}$ number of IDFT blocks 722, $N_{TX}$ number of GI insertion and windowing blocks 724 and $N_{TX}$ number of analog and RF blocks 726. The transmitter 700 further comprises a spatial stream pairing block 732 and a diversity scheme selection block 734.

The pre-FEC PHY padding block 702, the scrambler 704, the BCC encoder 706, the post-FEC padding block 708, the stream parser 710, the BCC interleaver 712, the constellation mapper 714, the CSD block 718, the spatial and frequency mapping block 720, the IDFT block 722, the GI insertion and windowing block 724 and the analog and RF block 726 have the exactly same functionality as their respective counterparts in the transmitter 200 as illustrated in FIG. 2.

The spatial stream pairing block 732 pairs $N_{ss}$ spatial streams into $N_p$ pairs. If $N_{ss}$ is an odd number, one of $N_{ss}$ spatial streams is unpaired. The diversity scheme selection block 734 determines diversity scheme(s) to be used according to the value of $N_{ss}$. The DCM/SFDS tone mapper 716 performs the DCM as illustrated in FIG. 3 for the unpaired spatial stream if $N_{ss}$ is an odd number and performs the SFDS as illustrated in FIG. 4 for each of the $N_p$ spatial stream pairs.

According to the configuration of the first embodiments of the present disclosure, by using the SFDS as the diversity transmission scheme for each of paired spatial streams, both frequency diversity and spatial diversity gain can be obtained for each of paired spatial streams if two or more spatial streams are transmitted in a RU. Thus, narrow-band interference experienced by an HE packet 100 is mitigated and PER performance of the HE packet 100 is improved. Further, no extra signaling bits are required for reporting which diversity transmission scheme is used for which spatial stream to a receiver.

Second Embodiment

FIG. 8 illustrates an example method 800 for performing diversity transmission according to a second embodiment of the present disclosure. The method 800 starts at step 802. At step 804, if the number of spatial streams, $N_{ss}$, is equal to 1, then the method 800 goes to step 806. Otherwise the method 800 goes to step 808.

At step 806, the DCM as illustrated in FIG. 3 is applied to a single spatial stream. The method 800 stops at step 818. At step 808, if the number of spatial streams, $N_{ss}$, is an even number, then the method 800 goes to step 810. Otherwise the method 800 goes to step 814.

At step 810, $N_{ss}$ spatial streams are grouped into $N_g$ groups where $$N_g = \text{floor}(N_{ss}/2) \quad (2).$$

Each of which comprises two spatial streams. At step 812, the SFDS as illustrated in FIG. 4 is applied to each of the $N_g$ two-spatial-stream groups. The method 800 stops at step 818.

At step 814, $N_{ss}$ spatial streams are grouped into $N_g$ groups where one of the $N_g$ groups comprises three spatial streams and each of the remaining $(N_g-1)$ groups comprises two spatial streams. At step 816, the conventional SFDS as illustrated in FIG. 4 is applied to each of the $(N_g-1)$ two-spatial-stream groups and an enhanced SFDS (e-SFDS) is applied to the three-spatial-stream group. The operation of the e-SFDS will be explained in detail later. The method 800 stops at step 818.

According to the second embodiment of the present disclosure, the method for grouping spatial streams can be configurable or predetermined. In case that a plurality of methods for grouping spatial streams are configurable, an additional signaling is required in the HE-SIG-A 110, the user-specific subfield of the HE-SIG-B 112 or the trigger frame to indicate the method that is actually used for grouping spatial streams.

According to the second embodiment of the present disclosure, for OL MIMO, spatial streams can be grouped based on physical antenna configuration and mapping of spatial streams to antennas so that the correlation among the grouped spatial streams is as weak as possible. In order to achieve that, it is preferable to avoid grouping the spatial streams to be transmitted through the adjacent antennas into the same group and to maximize the minimum physical distance among the antennas through which the spatial streams in the same group are transmitted.

In case that the stream indices assigned to the spatial streams are in align with physical antenna configuration, if $N_{ss}$ is an even number, an example method for grouping spatial streams into $N_g$ spatial stream groups comprises grouping every two spatial streams separated by $N_g$ in terms of stream index together, starting from the spatial stream with the smallest stream index. If $N_{ss}$ is an odd number and larger than 1, an example method for grouping spatial streams into $N_g$ spatial stream groups comprises grouping every two spatial streams separated by $N_g$ in terms of stream index together for each of the $(N_g-1)$ two-spatial-stream groups, starting from the spatial stream with the second smallest stream index. The remaining three spatial streams are grouped into the three-spatial-stream group. As a result, spatial diversity gain for each of spatial streams may be improved, especially for OL MIMO transmission with direct mapping.

Figure 9A:
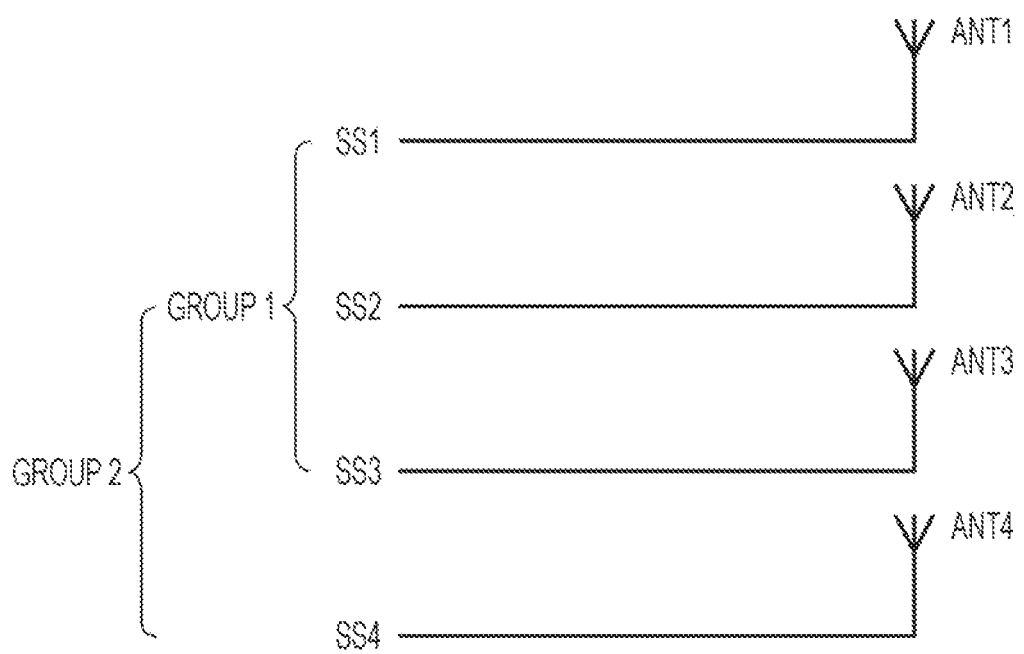
FIG. 9A shows a diagram illustrating an example grouping of spatial streams in case of OL MIMO transmission with direct mapping and four spatial streams according to the second embodiment of the present disclosure, where the stream indices assigned to spatial streams are in align with the physical antenna configuration.

FIG. 9A illustrates an example grouping of spatial streams in case of OL MIMO transmission with direct mapping and four spatial streams according to the second embodiment of the present disclosure. Here, the stream indices assigned to spatial streams are in align with the physical antenna configuration. Notice that correlation between the first spatial stream SS1 and the third spatial stream SS3 is generally weaker than correlation between the first spatial stream SS1 and the second spatial stream SS2 and but is similar to correlation between the second spatial stream SS2 and the fourth spatial stream SS4. Thus, it is better to group SS1 and SS3 and to group SS2 and SS4 so that each of the four spatial streams can achieve similar and better spatial diversity gain.

Figure 9B:
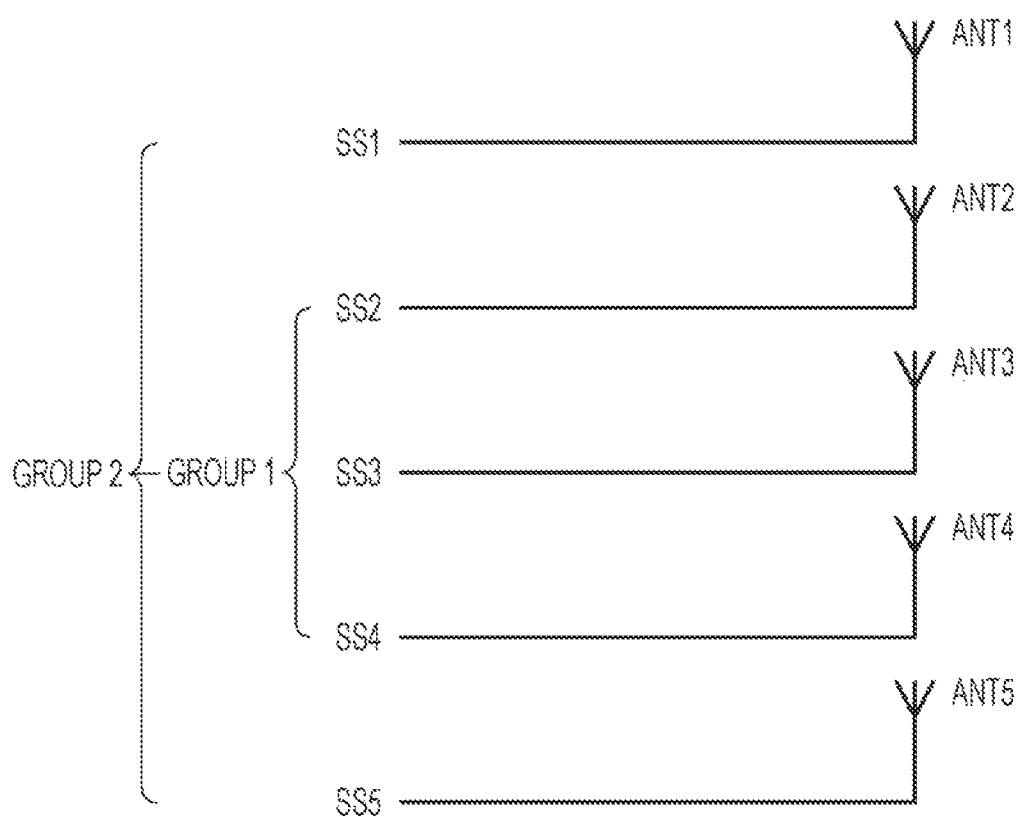
FIG. 9B shows a diagram illustrating another example grouping of spatial streams in case of OL MIMO transmission with direct mapping and five spatial streams according to the second embodiment of the present disclosure, where the stream indices assigned to spatial streams are in align with the physical antenna configuration.

FIG. 9B illustrates another example grouping of spatial streams in case of OL MIMO transmission with direct mapping and five spatial streams according to the second embodiment of the present disclosure. Here, the stream indices assigned to spatial streams are in align with the physical antenna configuration. Notice that correlation between the first spatial stream SS1 and the third spatial stream SS3 is generally weaker than correlation between the first spatial stream SS1 and the second spatial stream SS2 and but is similar to correlation between the second spatial stream SS2 and the fourth spatial stream SS4 or between the third spatial stream SS3 and the fifth spatial stream SS5. Thus, it is better to group SS1, SS3 and SS5 and to group SS2 and SS4 so that each of SS1 to SS5 can achieve similar and better spatial diversity gain.

Figure 9C:
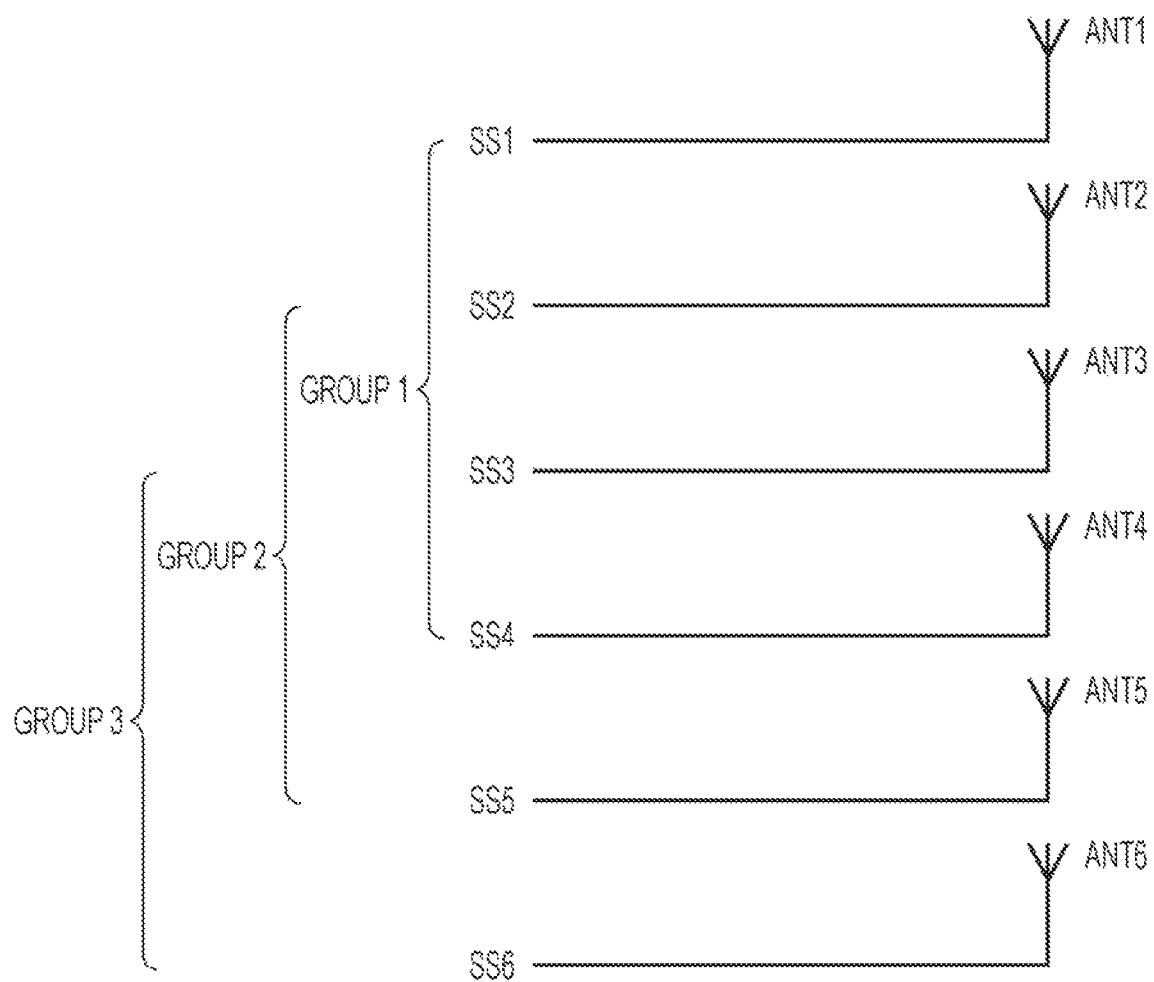
FIG. 9C shows a diagram illustrating another example grouping of spatial streams in case of OL MIMO transmission with direct mapping and six spatial streams according to the second embodiment of the present disclosure, where the stream indices assigned to spatial streams are in align with the physical antenna configuration.

FIG. 9C illustrates another example grouping of spatial streams in case of OL MIMO transmission with direct mapping and six spatial streams according to the second embodiment of the present disclosure. Here, the stream indices assigned to spatial streams are in align with the physical antenna configuration. Notice that correlation between the first spatial stream SS1 and the fourth spatial stream SS4 is generally weaker than correlation between the first spatial stream SS1 and the second spatial stream SS2 or between the first spatial stream SS1 and the third spatial stream SS3 but is similar to correlation between the second spatial stream SS2 and the fifth spatial stream SS5 or between the third spatial stream SS3 and the sixth spatial stream SS6. Thus, it is better to pair SS1 and SS4, to pair SS2 and SS5 and to pair SS3 and SS6 so that each of SS1 to SS6 can achieve similar and better spatial diversity gain.

Figure 9D:
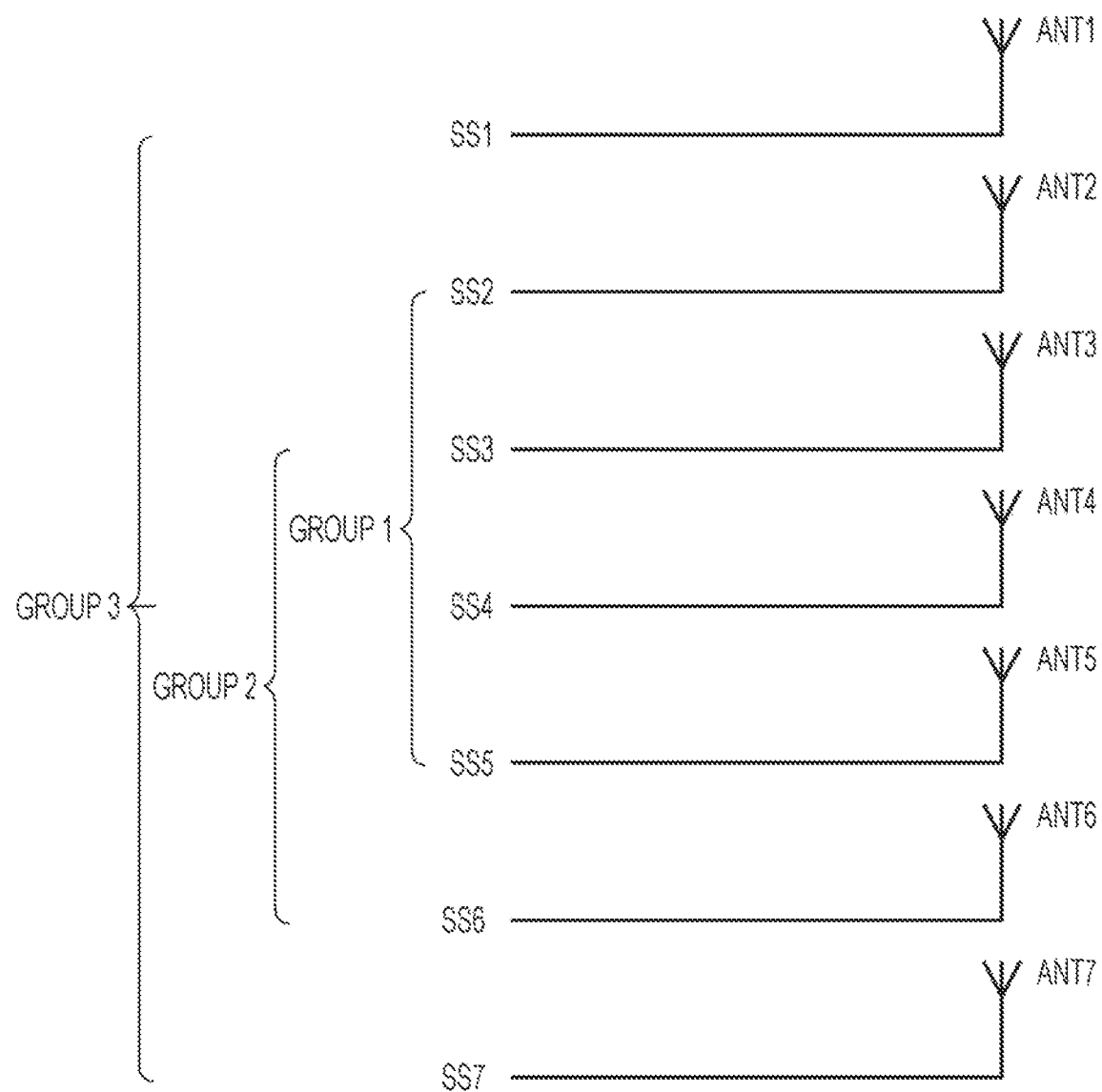
FIG. 9D shows a diagram illustrating another example grouping of spatial streams in case of OL MIMO transmission with direct mapping and seven spatial streams according to the second embodiment of the present disclosure, where the stream indices assigned to spatial streams are in align with the physical antenna configuration.

FIG. 9D illustrates another example grouping of spatial streams in case of OL MIMO transmission with direct mapping and seven spatial streams according to the second embodiment of the present disclosure. Here, the stream indices assigned to spatial streams are in align with the physical antenna configuration. Notice that correlation between the first spatial stream SS1 and the fourth spatial stream SS4 is generally weaker than correlation between the first spatial stream SS1 and the second spatial stream SS2 or between the first spatial stream SS1 and the third spatial stream SS3 and but is similar to correlation between the second spatial stream SS2 and the fifth spatial stream SS5, between the third spatial stream SS3 and the sixth spatial stream SS6 or between the fourth spatial stream SS4 and the seventh spatial stream SS7. Thus, it is better to group SS1, SS4 and SS7, to group SS2 and SS5 and to group SS3 and SS6 so that each of SS1 to SS7 can achieve similar and better spatial diversity gain.

Figure 9E:
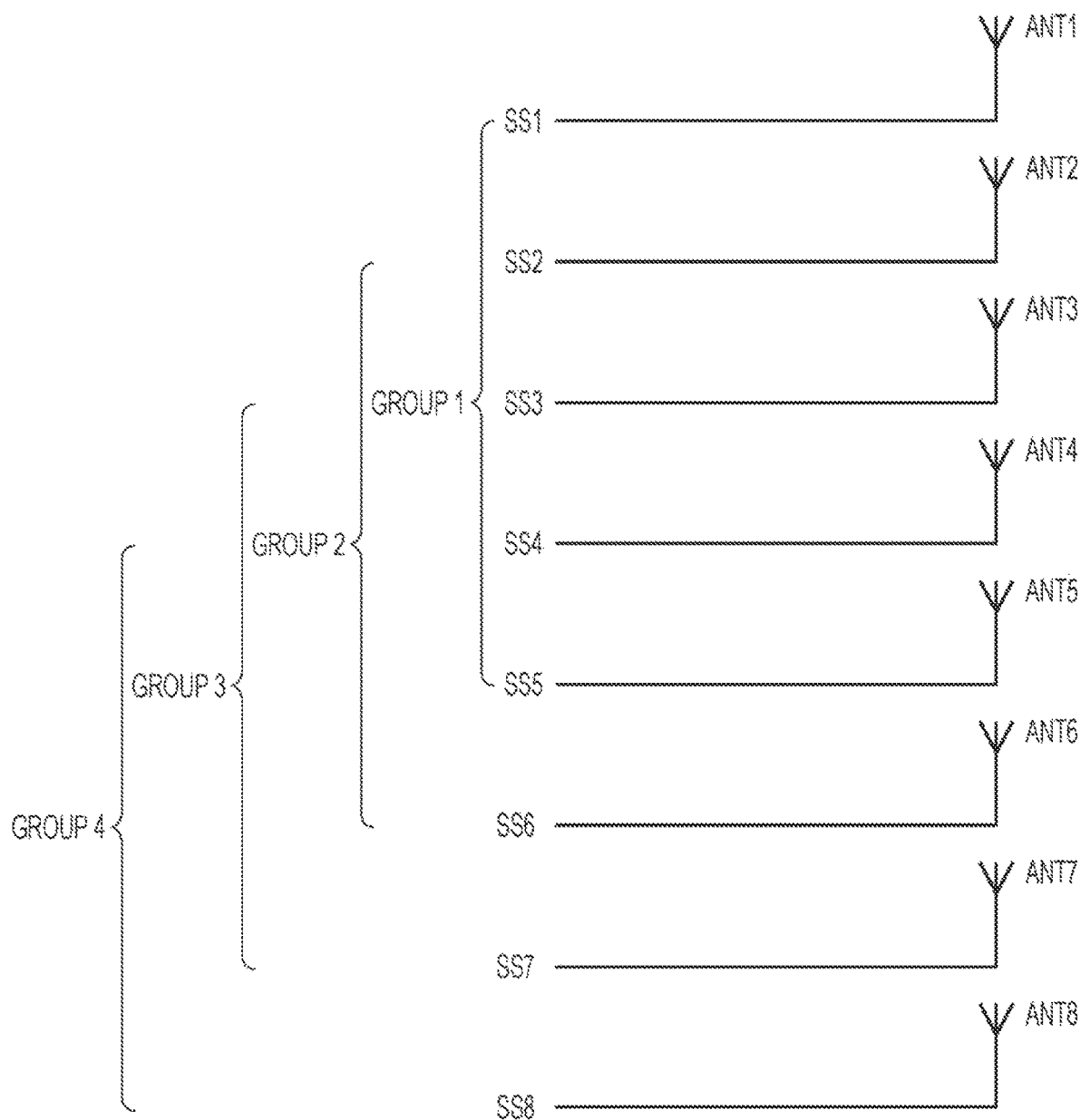
FIG. 9E shows a diagram illustrating another example grouping of spatial streams in case of OL MIMO transmission with direct mapping and eight spatial streams according to the second embodiment of the present disclosure, where the stream indices assigned to spatial streams are in align with the physical antenna configuration.

FIG. 9E illustrates another example grouping of spatial streams in case of OL MIMO transmission with direct mapping and eight spatial streams according to the second embodiment of the present disclosure. Here, the stream indices assigned to spatial streams are in align with the physical antenna configuration. Notice that correlation between the first spatial stream SS1 and the fifth spatial stream SS5 is generally weaker than correlation between the first spatial stream SS1 and the second spatial stream SS2, between the first spatial stream SS1 and the third spatial stream SS3, or between the first spatial stream SS1 and the fourth spatial stream SS4 and but is similar to correlation between the second spatial stream SS2 and the sixth spatial stream SS6, between the third spatial stream SS3 and the seventh spatial stream SS7, or between the fourth spatial stream SS4 and the eighth spatial stream SS8. Thus, it is better to pair SS1 and SS5, to pair SS2 and SS6 to, pair SS3 and SS7 and to pair SS4 and SS8 so that each of SS1 to SS8 can achieve similar and better spatial diversity gain.

Figure 9F:
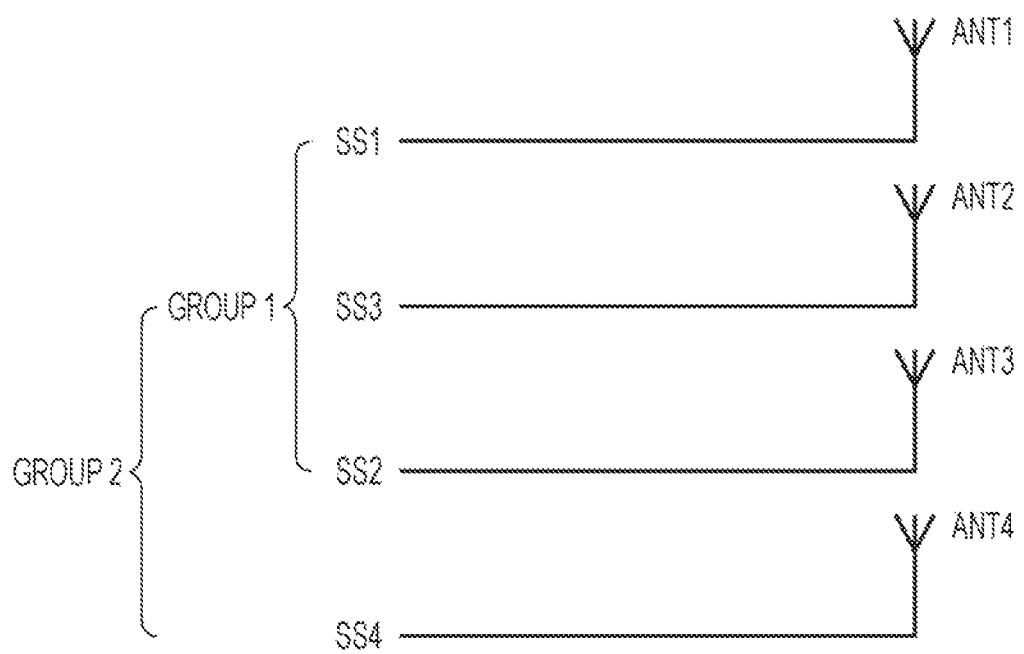
FIG. 9F shows a diagram illustrating another example grouping of spatial streams in case of OL MIMO transmission with direct mapping and four spatial streams according to the second embodiment of the present disclosure, where the stream indices assigned to spatial streams are not in align with the physical antenna configuration.

FIG. 9F illustrates another example grouping of spatial streams in case of OL MIMO transmission with direct mapping and four spatial streams according to the second embodiment of the present disclosure. Here, the stream indices assigned to spatial streams are not in align with the physical antenna configuration. Notice that correlation between the first spatial stream SS1 and the second spatial stream SS2 is generally weaker than correlation between the first spatial stream SS1 and the third spatial stream SS3 and but is similar to correlation between the third spatial stream SS3 and the fourth spatial stream SS4. Thus, it is better to group SS1 and SS2 and to group SS3 and SS4 so that SS1, SS2, SS3, SS4 can achieve similar and better spatial diversity gain.

Figure 9G:
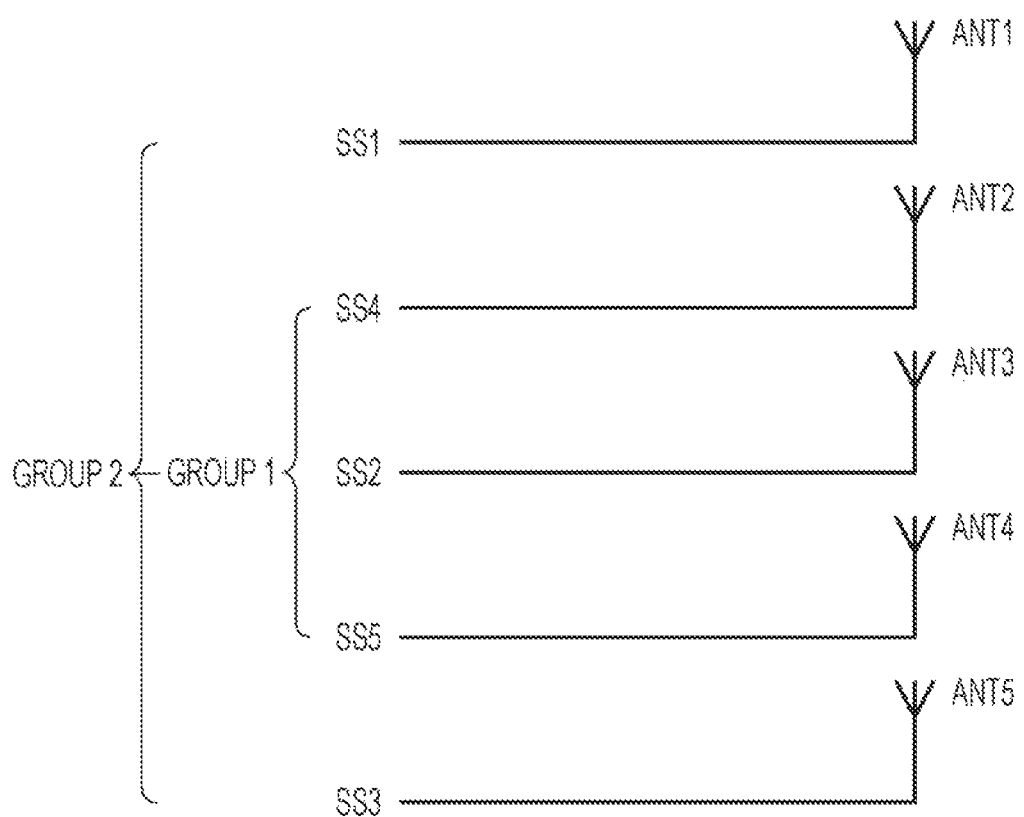
FIG. 9G shows a diagram illustrating another example grouping of spatial streams in case of OL MIMO transmission with direct mapping and five spatial streams according to the second embodiment of the present disclosure, where the stream indices assigned to spatial streams are not in align with the physical antenna configuration.

FIG. 9G illustrates another example grouping of spatial streams in case of OL MIMO transmission with direct mapping and five spatial streams according to the second embodiment of the present disclosure. Here, the stream indices assigned to spatial streams are not in align with the physical antenna configuration. Notice that correlation between the first spatial stream SS1 and the second spatial stream SS2 is generally weaker than correlation between the first spatial stream SS1 and the fourth spatial stream SS4 and but is similar to correlation between the fourth spatial stream SS4 and the fifth spatial stream SS5 or between the second spatial stream SS2 and the third spatial stream SS3. Thus, it is better to group SS1, SS2 and SS3 and group SS4 and SS5 so that each of SS1 to SS5 can achieve similar and better spatial diversity gain.

Figure 10:
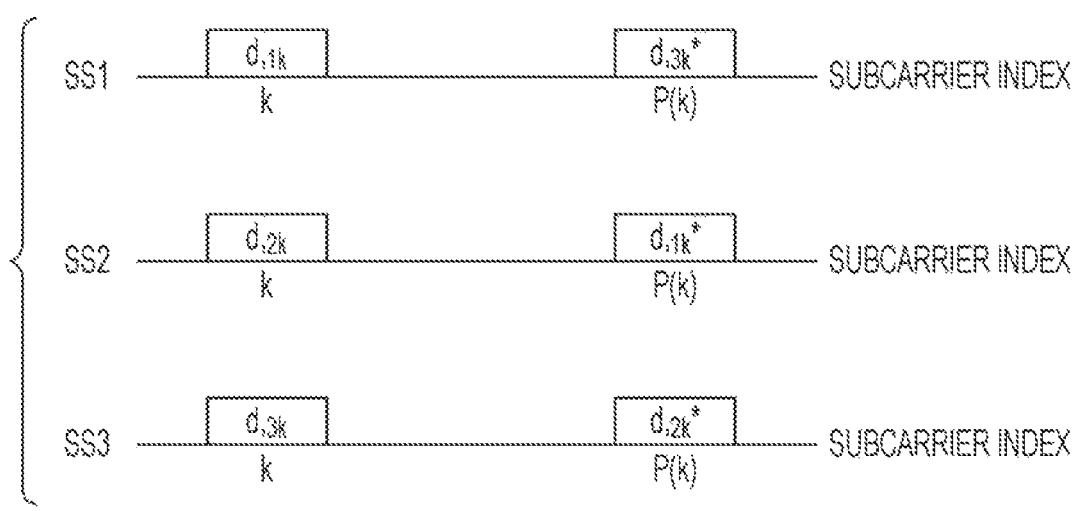
FIG. 10 shows a diagram illustrating an example operation of the e-SFDS (Enhanced SFDS) in case of QPSK modulation according to the second embodiment of the present disclosure.

FIG. 10 illustrates an example operation of the e-SFDS in case of QPSK modulation is used according to the second embodiment of the present disclosure. The e-SFDS is performed across three spatial streams. The encoded and interleaved bits in the data block corresponding to the first spatial stream SS1 are modulated by QPSK and mapped to the lower half of data subcarriers (left-hand side in FIG. 10) in a RU corresponding to the first spatial stream SS1, i.e., $\{d_{1,k}, k=0, 1, \ldots, N_{SD}/2-1\}$. The modulated symbols of the lower half of data subcarriers in the RU corresponding to the first spatial stream SS1 are repeated, conjugated and then mapped to the upper half of data subcarriers (right-hand side in FIG. 10) in the RU corresponding to the second spatial stream SS2, i.e., $$\{d_{2,P(k)}=d^*_{1,k}, N_{SD}/2 \leq P(k) \leq N_{SD}-1 \text{ and } k=0,1,\ldots,N_{SD}/2-1\}.$$

The encoded and interleaved bits in the data block corresponding to the second spatial stream SS2 are modulated by QPSK and mapped to the lower half of data subcarriers in the RU corresponding to the second spatial stream SS2, i.e., $\{d_{2,k}, k=0, 1, \ldots, N_{SD}/2-1\}$. The modulated symbols of the lower half of data subcarriers in the RU corresponding to the second spatial stream SS2 are repeated, conjugated and then mapped to the upper half of data subcarriers in the RU corresponding to the third spatial stream SS3, i.e., $$\{d_{3,P(k)}=d^*_{2,k}, N_{SD}/2 \leq P(k) \leq N_{SD}-1 \text{ and } k=0,1,\ldots,N_{SD}/2-1\}.$$

The encoded and interleaved bits in the data block corresponding to the third spatial stream SS3 are modulated by QPSK and mapped to the lower half of data subcarriers in the RU corresponding to the third spatial stream SS3, i.e., $\{d_{3,k}, k=0, 1, \ldots, N_{SD}/2-1\}$. The modulated symbols of the lower half of data subcarriers in the RU corresponding to the third spatial stream SS3 are repeated, conjugated and then mapped to the upper half of data subcarriers in the RU corresponding to the first spatial stream SS1, i.e., $$\{d_{1,P(k)}=d^*_{3,k}, N_{SD}/2 \leq P(k) \leq N_{SD}-1 \text{ and } k=0,1,\ldots,N_{SD}/2-1\}.$$

According to the second embodiment of the present disclosure, a merit of the e-SFDS is both frequency diversity and spatial diversity gain can be obtained for each of three spatial streams in one three-spatial-stream group.

Notice that the e-SFDS as illustrated in FIG. 9 may not be used in case of higher order modulation (e.g., 64-QAM), since it may reduce data rate for higher order modulation at a cost of achieving higher error performance.

According to the second embodiment of the present disclosure, diversity transmission is enabled for a single user transmission in a RU and the three diversity transmission schemes including the DCM, the conventional SFDS and the e-SFDS are applicable to the modulation scheme used in the RU. Diversity transmission schemes used in the RU are determined exclusively according to the number of spatial streams, $N_{ss}$, to be transmitted in the RU as follows:

If $N_{ss}=1$, the DCM is applied to a single spatial stream.

If $N_{ss}$ is an even number, the conventional SFDS is applied to each of $N_g$ two-spatial-stream groups. For example, in case of $N_{ss}=2$, the conventional SFDS is applied to a single two-spatial-stream group.

If $N_{ss}$ is an odd number and larger than 1, there are $N_g$ groups. The conventional SFDS is applied to each of $(N_g-1)$ two-spatial-stream groups and the e-SFDS is applied to a three-spatial-stream group. For example, in case of $N_{ss}=3$, the e-SFDS is applied to a single three-spatial-stream group. In case of $N_{ss}=5$, the conventional SFDS is applied to a two-spatial-stream group and the e-SFDS is applied to a three-spatial-stream group.

According to the second embodiment of the present disclosure, the DCM field in the HE-SIG-A 110, the user-specific subfield of the HE-SIG-B 112 of an HE packet 100 in FIG. 1 or the trigger frame can be repurposed to indicate whether the diversity transmission is enabled. In case that the diversity transmission is enabled, the receiver shall be able to determine which diversity transmission scheme(s) is used according to the number of spatial streams, $N_{ss}$.

According to the above-mentioned configuration, by using the SFDS as the diversity transmission scheme for each of the two-spatial-stream groups and using the e-SFDS as the diversity transmission scheme for the three-spatial-stream group, both frequency diversity and spatial diversity gain can be obtained for each of $N_{ss}$ spatial streams, if two or more spatial streams are transmitted in a RU. Thus, narrow-band interference experienced by an HE packet 100 is mitigated and PER performance of the HE packet 100 is improved. Further, since a transmitter determines which diversity transmission scheme to be used for which spatial stream based on the number of spatial streams, a receiver is able to know which diversity transmission scheme is used for which spatial stream without receiving additional signaling bits for reporting which diversity transmission scheme is actually used for which spatial stream, even when two or more spatial streams are transmitted in a RU. Thus, no extra signaling bits are required for supporting the above-mentioned configuration. This is very important since the HE-SIG-A field or the user-specific subfield of HE-SIG-B field may not have enough signaling bits to indicate which diversity transmission scheme is used for which spatial stream.

According to the second embodiment of the present disclosure, prior to decoding the HE data field 120 of an HE packet 100 for a single user transmission in a RU, a receiver shall be able to know how spatial streams are grouped according to the number of spatial streams, $N_{ss}$. For example, if $N_{ss}=4$, a first two-spatial-stream group comprises SS1 and SS3 and a second two-spatial-stream group comprises SS2 and SS4.

According to the second embodiment of the present disclosure, the method for decoding the HE data field 120 of an HE packet 100 in FIG. 1 for a single user transmission in a RU at the receiver in case that $N_{ss}$ is an even number comprises decoding the information bits from a first spatial stream and a second spatial stream in each of $N_{ss}/2$ two-spatial-stream groups and deparsing $N_{ss}$ spatial streams to obtain a sequence of decoded information bits.

According to the second embodiment of the present disclosure, the method for decoding the HE data field 120 of an HE packet 100 in FIG. 1 for a single user transmission in a RU at the receiver in case that Nss is an odd number and larger than 1 comprises decoding the information bits from a first spatial stream and a second spatial stream in each of the ($N_g-1$) two-spatial-stream groups; decoding the information bits from a first spatial stream, a second spatial stream and a third spatial stream in a three-spatial-stream group and deparsing Nss spatial streams to obtain a sequence of decoded information bits.

According to the second embodiment of the present disclosure, for decoding the information bits from a first spatial stream in a two-spatial-stream group, the receiver calculates the LLR at a first data subcarrier k ($k=0, 1, \ldots, N_{SD}/2-1$) corresponding to the first spatial stream in the group and the LLR at a second data subcarrier P(k)

$(N_{SD}/2 \leq P(k) \leq N_{SD}-1$ and $k=0,1, \ldots, N_{SD}/2-1)$ corresponding to a second spatial stream in the group, and then combines both LLRs. For decoding the information bits from the second spatial stream in the two-spatial-stream group, the receiver calculates the LLR at the first data subcarrier k ($k=0, 1, \ldots, N_{SD}/2-1$) corresponding to the second spatial stream in the group and the LLR at the second data subcarrier P(k)

$(N_{SD}/2 \leq P(k) \leq N_{SD}-1$ and $k=0,1, \ldots, N_{SD}/2-1)$ corresponding to the first spatial stream in the group, and then combines both LLRs.

According to the second embodiment of the present disclosure, for decoding the information bits from a first spatial stream in a three-spatial-stream group, the receiver calculates the LLR at a first data subcarrier k ($k=0, 1, \ldots, N_{SD}/2-1$) corresponding to the first spatial stream in the group and the LLR at a second data subcarrier P(k)

$(N_{SD}/2 \leq P(k) \leq N_{SD}-1$ and $k=0,1, \ldots, N_{SD}/2-1)$ corresponding to a second spatial stream in the group, and then combines both LLRs. For decoding the information bits from the second spatial stream in the group, the receiver calculates the LLR at the first data subcarrier k ($k=0, 1, \ldots, N_{SD}/2-1$) corresponding to the second spatial stream in the group and the LLR at the second data subcarrier P(k)

$(N_{SD}/2 \leq P(k) \leq N_{SD}-1$ and $k=0,1, \ldots, N_{SD}/2-1)$ corresponding to a third spatial stream in the group, and then combines both LLRs. For decoding the information bits from the third spatial stream in the group, the receiver just calculates the LLR at the first data subcarrier k ($k=0, 1, \ldots, N_{SD}/2-1$) corresponding to the third spatial stream in the group and the LLR at the second data subcarrier P(k)

$(N_{SD}/2 \leq P(k) \leq N_{SD}-1$ and $k=0,1, \ldots, N_{SD}/2-1)$ corresponding to the first spatial stream in the group, and then combines both LLRs.

Figure 11:
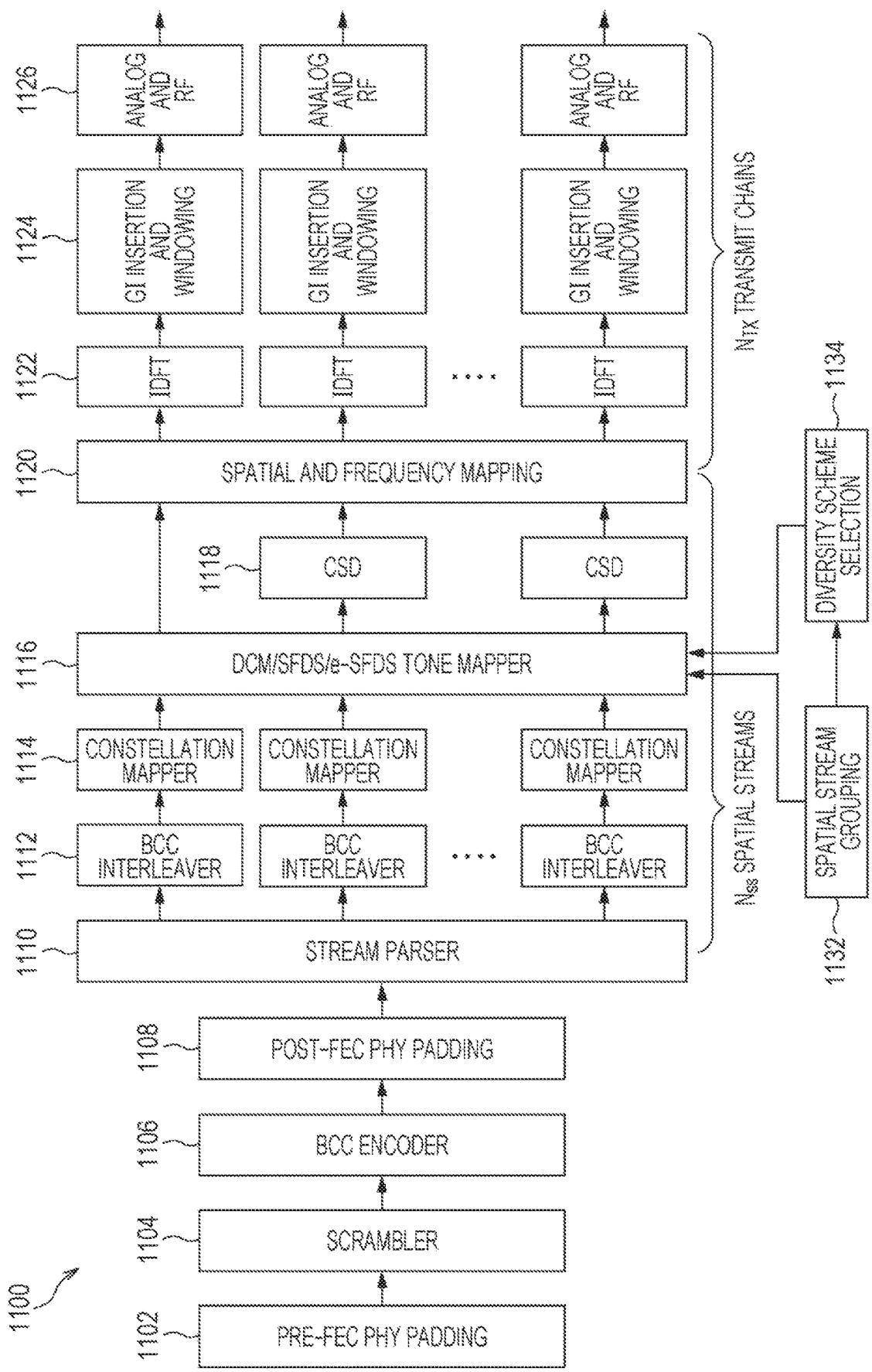
FIG. 11 shows an example configuration of a transmitter used to generate the HE data field of an HE packet for a single user transmission in a RU using diversity transmission and BCC according to the second embodiment of the present disclosure.

FIG. 11 illustrates an example configuration of transmitter 1100 used to generate the HE data field 120 of an HE packet 100 in FIG. 1 for a single user transmission in a RU using diversity transmission and BCC according to the second embodiment of the present disclosure. The transmitter 1100 comprises a pre-FEC PHY padding block 1102, a scrambler 1104, a BCC encoder 1106, a post-FEC PHY padding block 1108, a stream parser 1110, $N_{ss}$ number of BCC interleavers 1112, $N_{ss}$ number of constellation mappers 1114, a DCM/SFDS/e-SFDS tone mapper 1116, ($N_{ss}-1$) number of CSD blocks 1118, a spatial and frequency mapping block 1120, $N_{TX}$ number of IDFT blocks 1122, $N_{TX}$ number of GI insertion and windowing blocks 1124 and $N_{TX}$ number of analog and RF blocks 1126, where $N_{ss}$ is the number of spatial streams and $N_{TX}$ is the number of transmit chains. The transmitter 1100 further comprises a spatial stream grouping block 1132 and a diversity scheme selection block 1134.

The pre-FEC PHY padding block 1102, the scrambler 1104, the BCC encoder 1106, the post-FEC padding block 1108, the stream parser 1110, the BCC interleaver 1112, the constellation mapper 1114, the CSD block 1118, the spatial and frequency mapping block 1120, the IDFT block 1122, the GI insertion and windowing block 1124 and the analog and RF block 1126 have the exactly same functionality as their respective counterparts in the transmitter 200 as illustrated in FIG. 2.

The spatial stream grouping block 1132 groups $N_{ss}$ spatial streams into $N_g$ groups if $N_{ss}$ is larger than 1. If $N_{ss}$ is an even number, all of the $N_g$ groups are the two-spatial-stream groups. If $N_{ss}$ is an odd number, one of the $N_g$ groups is a three-spatial-stream group, and each of the remaining ($N_g$-1) groups is a two-spatial-stream group. The diversity scheme selection block 1134 determines diversity scheme(s) to be used for each group according to the value of $N_{ss}$. In case of $N_{ss}$=1, the DCM/SFDS/e-SFDS tone mapper 1116 performs the DCM as illustrated in FIG. 3 for a single spatial stream. In case that $N_{ss}$ is an even number, the DCM/SFDS/e-SFDS tone mapper 1116 performs the conventional SFDS as illustrated in FIG. 4 for each of the $N_g$ two-spatial-stream groups. In case that $N_{ss}$ is larger than 1 and $N_{ss}$ is an odd number, the DCM/SFDS/e-SFDS tone mapper 1116 performs the e-SFDS as illustrated in FIG. 10 for a three-spatial-stream group and the conventional SFDS as illustrated in FIG. 4 for each of remaining ($N_g$-1) two-spatial-stream groups.

According to the configuration of the second embodiments of the present disclosure, by using the SFDS as the diversity transmission scheme for each of the two-spatial-stream groups and using the e-SFDS as the diversity transmission scheme for the three-spatial-stream group, both frequency diversity and spatial diversity gain can be obtained for each of $N_{ss}$ spatial streams if two or more spatial streams are transmitted in a RU. Thus, narrow-band interference experienced by an HE packet 100 is mitigated and PER performance of the HE packet 100 is improved. Further, no extra signaling bits are required for reporting which diversity transmission scheme is used for which spatial stream to a receiver.

<Configuration of a Wireless Communication Apparatus>

Figure 12:
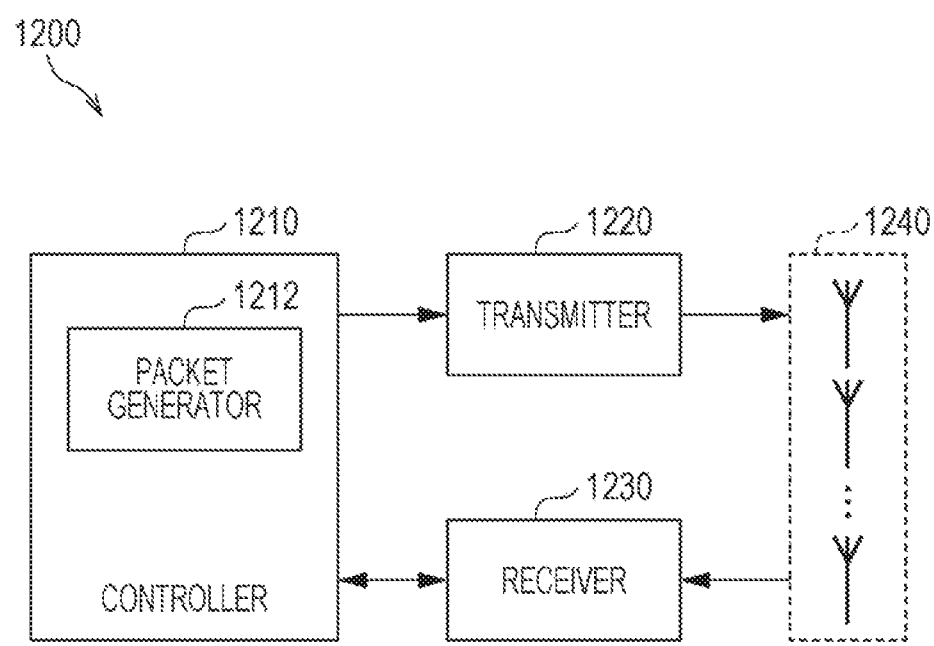
FIG. 12 shows an example configuration of a wireless communication apparatus according to the present disclosure.

FIG. 12 shows an example configuration of a wireless communication apparatus 1200 according to the first and the second embodiments of the present disclosure. The wireless communication apparatus 1200 can be an AP in a centralized wireless network, an STA in the centralized wireless network, or a node in a peer-to-peer wireless network. The wireless communication apparatus 1200 comprises a controller 1210, a transmitter 1220, a receiver 1230 and a plurality of antennas 1240. The controller 1210 comprises a packet generator 1212. The packet generator 1212 is configured to create packets as shown in FIG. 1. The created packets are transmitted through the antenna 1240 after transmission processing by the transmitter 1220 according to the one of the various embodiments of the present disclosure. On the other hand, the controller 1210 is configured to analyze and process packets which are received through the antenna 1240 after reception processing by the receiver 1230.

In the foregoing embodiments, the present disclosure is configured with hardware by way of the above explained example, but the disclosure may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

This disclosure can be applied to a method for diversity transmission in a wireless communications system.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A station, comprising:
a receiver which, in operation, receives a signal that includes a non-legacy preamble and a data field, the non-legacy preamble comprising a first field for indicating a number of spatial streams (Nss) in the data field and a second field for indicating one of a plurality of modulation and coding schemes (MCSs), wherein two or more frequency diversity transmission schemes are supported and one of the two or more frequency diversity transmission schemes is specified based on a value of the Nss; and
circuitry which, in operation, decodes the signal.

2. The station according to claim 1, wherein the non-legacy preamble comprises a third field for indicating whether at least one of the two or more frequency diversity transmission schemes is applied to the data field.

3. The station according to claim 1, wherein the two or more frequency diversity transmission schemes include a first scheme which is a frequency diversity scheme without spatial diversity.

4. The station according to claim 3, wherein if the value of the Nss equals to a first determined value and the non-legacy preamble indicates that the first scheme is applied to the data field, the first scheme is applied to at least one of the spatial streams.

5. The station according to claim 4, wherein the first determined value is an odd number.

6. The station according to claim 3, wherein the two or more frequency diversity transmission schemes include a second scheme which is a space-frequency diversity scheme (SFDS).

7. The station according to claim 6, wherein the first scheme and the second scheme are applied if the value of the Nss is an odd value.

8. The station according to claim 7, wherein more than two spatial streams are paired into Np=floor (Nss/2) spatial stream pairs and one of spatial streams is unpaired if the value of the Nss is larger than 3.

9. The station according to claim 8, wherein the first scheme is applied to the unpaired spatial stream and the second scheme is applied to each of the Np spatial stream pairs.

10. The station according to claim 8, wherein the spatial streams can be paired based on physical antenna configuration and mapping of spatial streams to antennas.

11. The station according to claim 1, wherein the spatial streams are grouped into Ng=floor (Nss/2) spatial stream groups if the value of the Nss is an odd value, wherein one of the Ng groups comprises three spatial streams and each of the remaining (Ng−1) groups comprises two spatial streams.

12. The station according to claim 11, wherein an enhanced Space Frequency Diversity Scheme (e-SFDS) is applied to a three-spatial-stream group and a SFDS is applied to each of the remaining (Ng−1) two-spatial-stream groups.

13. The station according to claim 11, wherein the spatial streams can be grouped based on physical antenna configuration and mapping of the spatial streams to antennas.

14. The station according to claim 6, wherein the second scheme is applied to the data field if the value of the Nss is an even value.

15. A station comprising:
a receiver which, in operation, receives a signal that includes a non-legacy preamble and a data field, the non-legacy preamble comprising a first field for indicating a number of spatial streams (Nss) in the data field and a second field for indicating one of a plurality of modulation and coding schemes (MCSs), wherein two or more frequency diversity transmission schemes are supported; and
circuitry which, in operation, decodes the signal, wherein
a first scheme of the two or more frequency diversity transmission schemes is a frequency diversity scheme without spatial diversity and
a second scheme of the two or more frequency diversity transmission schemes is a space-frequency diversity scheme, and
the first scheme is applied to at least one spatial stream if the non-legacy preamble indicates that at least one of the two or more frequency diversity transmission schemes is applied to the data field and the value of the Nss is an odd number.

16. A reception method comprising:
receiving a signal that includes a non-legacy preamble and a data field, the non-legacy preamble comprising a first field for indicating a number of spatial streams (Nss) in the data field and a second field for indicating one of a plurality of modulation and coding schemes (MCSs), wherein two or more frequency diversity transmission schemes are supported and one of the two or more frequency diversity transmission schemes is specified based on a value of the Nss; and
decoding the signal.

17. The reception method according to claim 16, wherein the non-legacy preamble comprises a third field for indicating whether at least one of the two or more frequency diversity transmission schemes is applied to the data field.

18. The reception method according to claim 16, wherein the two or more frequency diversity transmission schemes include a first scheme which is a frequency diversity scheme without spatial diversity.

19. The reception method according to claim 18, wherein if the value of the Nss equals to a first determined value and the non-legacy preamble indicates that the first scheme is applied to the data field, the first scheme is applied to at least one of the spatial streams.

20. The reception method according to claim 19, wherein the first determined value is an odd number.

* * * * *